United States Patent
Higo et al.

(10) Patent No.: US 9,857,166 B2
(45) Date of Patent: Jan. 2, 2018

(54) INFORMATION PROCESSING APPARATUS AND METHOD FOR MEASURING A TARGET OBJECT

(71) Applicant: CANON KABUSHIKI KAISHA, Tokyo (JP)

(72) Inventors: Tomoaki Higo, Tokyo (JP); Kazuyuki Ota, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 679 days.

(21) Appl. No.: 14/029,116

(22) Filed: Sep. 17, 2013

(65) Prior Publication Data
US 2014/0078490 A1   Mar. 20, 2014

(30) Foreign Application Priority Data

Sep. 19, 2012  (JP) ................................. 2012-205582
Dec. 6, 2012  (JP) ................................. 2012-267555

(51) Int. Cl.
*G01C 3/08* (2006.01)
*G01B 11/25* (2006.01)

(52) U.S. Cl.
CPC .................... *G01B 11/25* (2013.01)

(58) Field of Classification Search
CPC ................... G01C 3/08; G01B 11/25
See application file for complete search history.

(56) References Cited

U.S. PATENT DOCUMENTS

| 2007/0047940 A1* | 3/2007 | Matsumoto | G01C 15/004 396/106 |
| 2008/0084165 A1* | 4/2008 | Otsuka | B60Q 1/0023 315/82 |
| 2010/0128248 A1* | 5/2010 | Heizmann | G01S 7/484 356/5.01 |
| 2010/0299103 A1* | 11/2010 | Yoshikawa | G06T 7/0057 702/167 |
| 2010/0328649 A1* | 12/2010 | Ota | G01B 11/25 356/73 |

(Continued)

FOREIGN PATENT DOCUMENTS

| CN | 101061367 A | 10/2007 |
| CN | 102192714 A | 9/2011 |
| CN | 102472613 A | 5/2012 |

(Continued)

*Primary Examiner* — Samantha K Abraham
(74) *Attorney, Agent, or Firm* — Canon U.S.A., Inc. IP Division

(57) ABSTRACT

An information processing apparatus includes at least one projection unit configured to project a light pattern on a measuring target object, at least one imaging unit configured to capture an image of the measuring target object with the light pattern projected thereon, a measurement unit configured to measure a distance from the at least one projection unit or imaging unit to the measuring target object based on the image captured by the at least one imaging unit, a determination unit configured to determine whether a measured distance is valid, and a control unit configured to reduce luminance of a light pattern, included in a projected light pattern, which is projected on an area with respect to which the measured distance is determined by the determination unit to be valid.

17 Claims, 21 Drawing Sheets

(56) References Cited

U.S. PATENT DOCUMENTS

2012/0057758 A1\* 3/2012 Yang .................... G01B 11/026
  382/106

FOREIGN PATENT DOCUMENTS

| JP | 2004028874 A | 1/2004 |
|----|--------------|--------|
| JP | 2008-309551 A | 12/2008 |
| JP | 2009-019942 A | 1/2009 |
| JP | 2011-133306 A | 7/2011 |
| JP | 2011-257293 A | 12/2011 |

\* cited by examiner

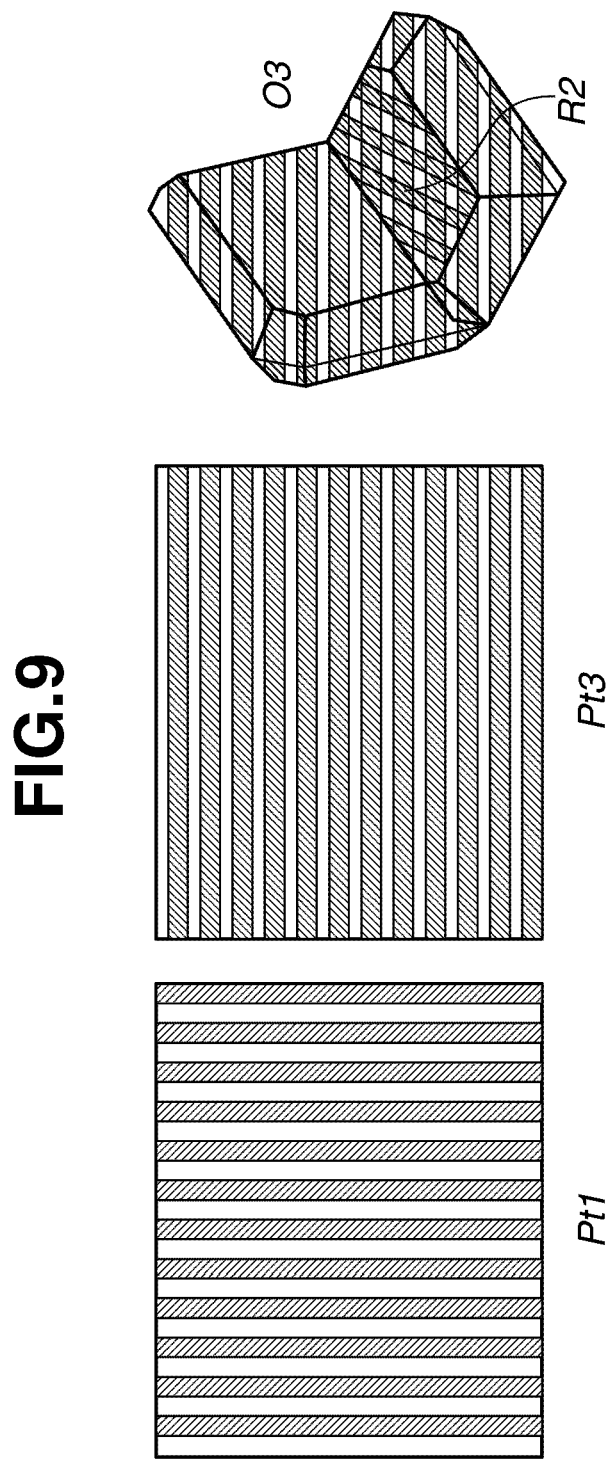

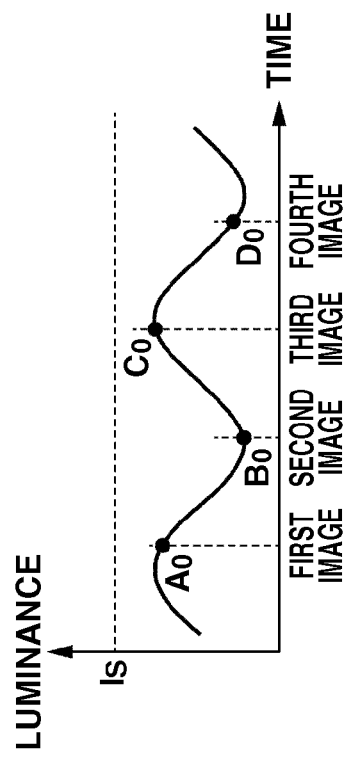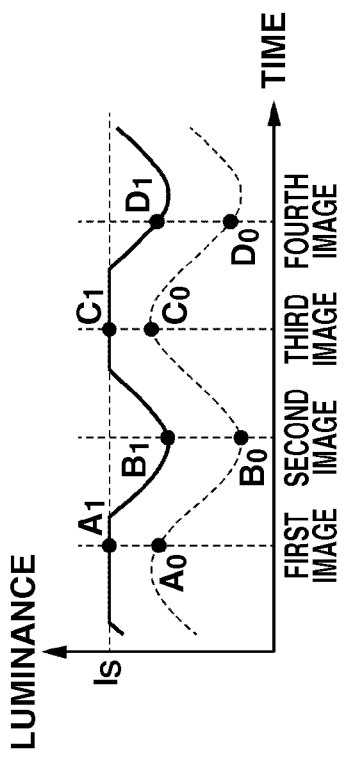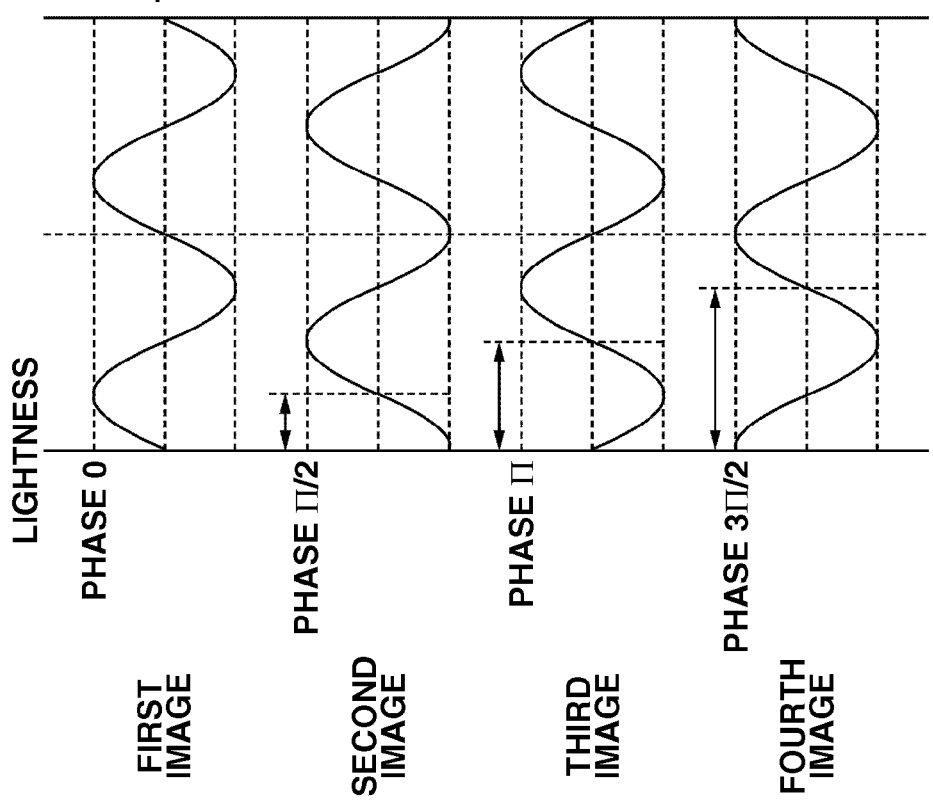

INFORMATION PROCESSING APPARATUS AND METHOD FOR MEASURING A TARGET OBJECT

BACKGROUND OF THE INVENTION

Field of the Invention

The present disclosure generally relates to information processing and more particularly, to a technique capable of three-dimensionally measuring a target object.

Description of the Related Art

Various types of methods are conventionally proposed to three-dimensionally measure a target object (e.g., a component of an industrial product). One of the conventional methods is a highly accurate and stable measuring method that includes projecting a predetermined projection pattern (e.g., a stripe pattern or a lattice pattern) on a measuring target object and capturing an image of the measuring target object. The method further includes obtaining a relationship between each image position (i.e., a pixel) of the captured image and a corresponding stripe position of the projection pattern, calculating the height of the measuring target object based on triangulation, and measuring a three-dimensional shape of the measuring target object.

In the above-mentioned three-dimensional measuring method, multiple reflections may occur if the measuring target object (e.g., a metallic member) is glossy. More specifically, a light pattern projected on one surface of a measuring target object may reflect on another surface of the measuring target object (may cause reflections a plurality of times) depending on the shape of the measuring target object. The reflection of light is referred to as primary reflection if it first reflects on a surface of the measuring target object. The reflection of light is referred to as secondary reflection if it sequentially reflects on two surfaces of the measuring target object. Further, the reflection of light is referred to as tertiary reflection if it sequentially reflects three times on the measuring target object. The above-mentioned secondary and higher-order reflections can be collectively referred to as multiple reflections. The multiple reflections can be also referred to as interreflection because reflections repetitively occur on different surfaces of a measuring target object. If multiple reflections occur, a glare appears although it is not originally present on the measuring target object. If the three-dimensional measuring processing is performed based on such a captured image, the measurement accuracy may deteriorate due to a noise caused by the glare.

To eliminate the glare, as discussed in Japanese Patent Application Laid-Open No. 2008-309551, it is conventionally proposed to dim or quench a part of the projection pattern that causes multiple reflections on surfaces of an inspected object. More specifically, it is conventionally known to project two types of different light patterns and obtain a three-dimensional shape based on each of these light patterns. Then, if there is a significant difference between two three-dimensional measurement results in a target area, it can be determined that multiple reflections are generated in this area. Further, the conventional method includes performing ray tracing to detect a surface on which multiple reflections occur, quenching a projection pattern portion that corresponds to the detected surface, and correcting the three-dimensional measurement result based on a captured image obtainable by projecting a newly quenched pattern on a measuring target object.

The method discussed in Japanese Patent Application Laid-Open No. 2008-309551 is disadvantageous in that the processing is complicated and takes a relatively long time because the ray tracing is performed to detect a projection pattern portion that causes multiple reflections.

SUMMARY OF THE INVENTION

According to an aspect of the present disclosure, an information processing apparatus includes at least one projection unit configured to project a light pattern on a measuring target object, at least one imaging unit configured to capture an image of the measuring target object with the light pattern projected thereon, a measurement unit configured to measure a distance from the at least one projection unit or the at least one imaging unit to the measuring target object based on the image captured by the at least one imaging unit, a determination unit configured to determine whether a measured distance is valid, and a control unit configured to reduce luminance of a light pattern, included in a projected light pattern, which is projected on an area with respect to which the measured distance is determined by the determination unit to be valid.

Further features of the present disclosure will become apparent from the following description of exemplary embodiments with reference to the attached drawings.

BRIEF DESCRIPTION OF THE DRAWINGS

FIG. 9 illustrates examples of a multiple reflection detecting pattern.

FIGS. 11A, 11B, and 11C illustrate a phase shift method according to the ninth exemplary embodiment together with an example occurrence of saturation.

DESCRIPTION OF THE EMBODIMENTS

Figure 1:
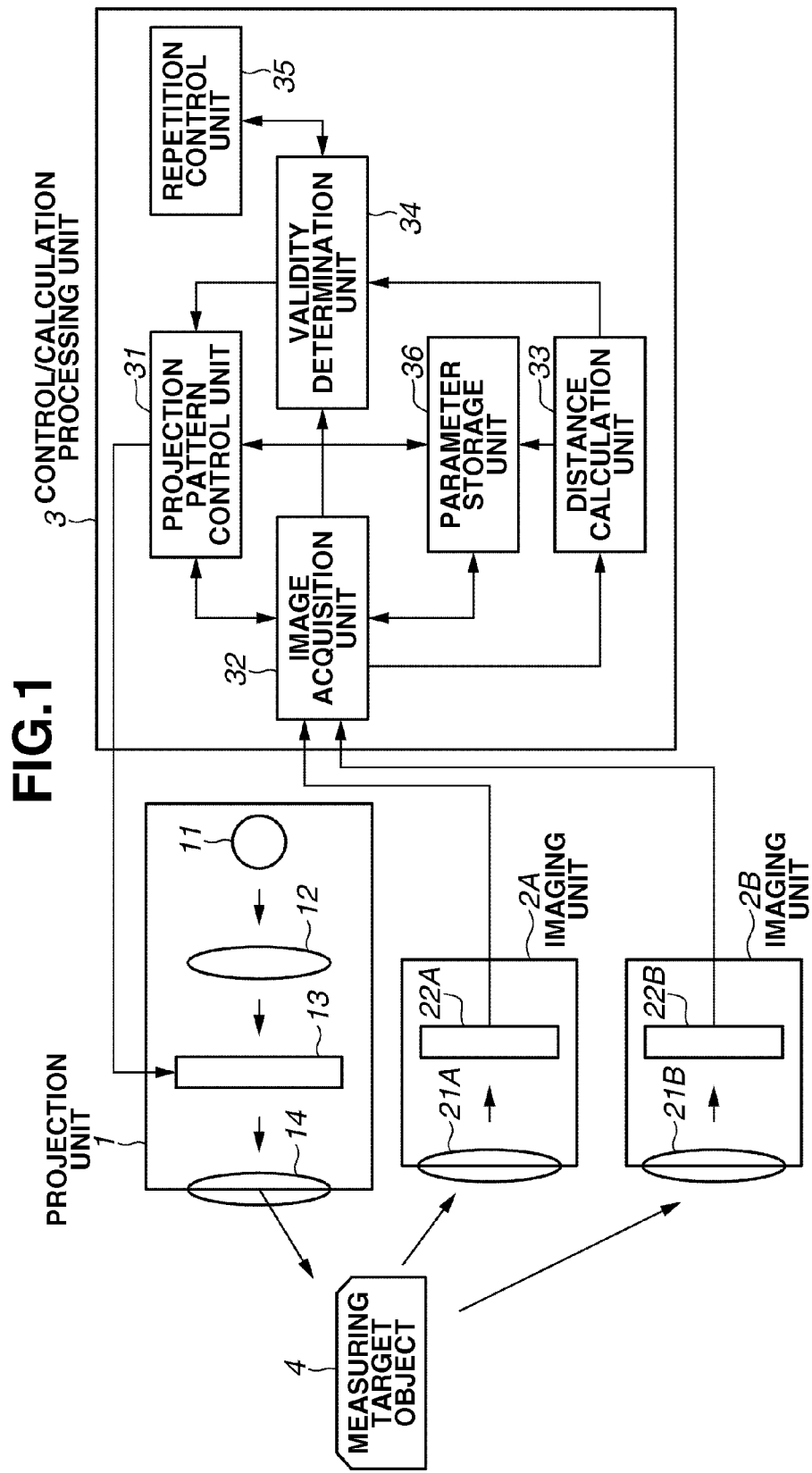
FIG. 1 illustrates the configuration of a distance measuring apparatus according to a first exemplary embodiment.

Various exemplary embodiments, features, and aspects of the disclosure will be described in detail below with reference to the drawings. However, the embodiments of the disclosure described below do not limit the claims.

In a first exemplary embodiment, a pattern projection unit (e.g., a projector) projects a light pattern on a measuring target object and an imaging unit (e.g., a camera) captures an image of the measuring target object with the light pattern projected thereon. The pattern projection unit and the imaging unit are cooperative with each other to perform three-dimensional measuring processing for the measuring target object. In the present exemplary embodiment, the three-dimensional measuring processing means measuring the distance from the imaging unit or the projection unit to the measuring target object. The distance measuring apparatus according to the present exemplary embodiment uses two imaging units and a single projection unit to perform three-dimensional measuring processing (namely, to measure the distance from the apparatus to the measuring target object) and determines whether the measured distance is valid. In the present exemplary embodiment, if a distance measurement value can be measured accurately and permissibly without being significantly influenced by multiple reflections and image noises, it is determined that the distance measurement value is valid. Although described in detail below, the distance measuring apparatus performs the distance measurement for each pixel of the projection unit. Therefore, the distance measuring apparatus performs validity determination processing for each pixel. In other words, the distance measuring apparatus performs the distance measurement for each area of the measuring target object included in one pixel of a display element provided in the projection unit, and determines whether the distance measurement value is valid for each area. Then, if the distance measurement value is determined to be valid for an area, the distance measuring apparatus performs processing for quenching or dimming a pixel of the display element of the projection unit corresponding to that area and repetitively performs three-dimensional measuring processing using a pattern obtainable by partly quenching or dimming the display element. Further, the distance measuring apparatus designates an arbitrary number of times as a termination determination condition in repeating the above-mentioned processing.

In the present exemplary embodiment, the distance measuring apparatus determines whether the distance measurement value of a measuring target object is valid for each pixel of the display element provided in the projection unit. However, the present disclosure is not limited to the above-mentioned example. For example, the distance measuring apparatus can determine whether the distance measurement value of a measuring target object is valid for every predetermined number of pixels of the display element provided in the projection unit. Further, the distance measuring apparatus can determine whether the distance measurement value of a measuring target object is valid for each pixel or for every predetermined number of pixels of a display element provided in the imaging unit.

Further, in the present exemplary embodiment, the distance measuring apparatus performs quenching or dimming processing for each pixel of the display element provided in the projection unit that corresponds to an area with respect to which the distance measurement value is determined to be valid. However, the present disclosure is not limited to the above-mentioned example. For example, the distance measuring apparatus can perform quenching or dimming processing for every predetermined number of pixels of the display element included in the projection unit.

FIG. 1 illustrates the configuration of a distance measuring apparatus according to the present exemplary embodiment. As illustrated in FIG. 1, the distance measuring apparatus according to the present exemplary embodiment includes a projection unit 1, two imaging units 2A and 2B, and a control/calculation processing unit 3. As used herein, the term "unit" generally refers to any combination of software, firmware, hardware, or other component that is used to effectuate a purpose.

The projection unit 1 can project a light pattern, such as a line light pattern, on a measuring target object 4. Each imaging unit 2A or 2B can capture an image of the measuring target object 4 with the light pattern projected thereon. The control/calculation processing unit 3 can control the projection unit 1 and the imaging unit 2A or 2B to measure the distance between the apparatus and the measuring target object 4 through calculation processing based on the captured image data.

The projection unit 1 includes a light source 11, an illumination optical system 12, a display element 13, and a projection optical system 14. The light source 11 is, for example, a halogen lamp, a light-emitting diode (LED), or another appropriate light-emitting element. The illumination optical system 12 is functionally operable as a unit configured to guide light, if emitted from the light source 11, to the display element 13. It is desired that the incident luminance is uniform when the light emitted from the light source 11 reaches the display element 13. Therefore, for example, a Koehler illuminator, a diffuser panel or any other optical system that is suitable to realize the uniform luminance is usable as the illumination optical system 12. The display element 13 is, for example, a transmission-type liquid crystal display (LCD) or a reflection-type liquid crystal on silicon digital micromirror device (LCOS•DMD). The display element 13 is functionally operable as a unit configured to control spatial transmittance or reflectance of the light guided from the illumination optical system 12 to the projection optical system 14. The projection optical system 14 is an optical system configured to form an image of the display element 13 at a specific position on the measuring target object 4. As an example of the projection optical system 14, a digital light processing (DLP) projector or a diffractive projector is employable. A projection apparatus according to the present exemplary embodiment is not limited to the above-mentioned combination of the display element 13 and the projection optical system 14. For example, the projection apparatus can be modified in such a way as to include a spotlight and a two-dimensional scanning optical system.

Each of the imaging units 2A and 2B includes an imaging lens 21A or 21B and an image sensor 22A or 22B. The imaging lens 21A or 21B is an optical system configured to form an image of a specific part of the measuring target object 4 on the image sensor 22A or 22B. The image sensor 22A or 22B is, for example, an appropriate photoelectric conversion element, such as a complementary metal-oxide-semiconductor (CMOS) sensor or a charge-coupled device (CCD) sensor.

The control/calculation processing unit 3 includes a projection pattern control unit 31, an image acquisition unit 32, a distance calculation unit 33, a validity determination unit 34, a repetition control unit 35, and a parameter storage unit 36. The control/calculation processing unit 3 has a hardware configuration similar to that of a general computer, which includes a central processing unit (CPU), memories, a storage device (e.g., a hard disk), and various input/output interfaces. Further, as a software configuration, the control/calculation processing unit 3 includes a distance measurement program, which enables a computer to realize a distance measuring method according to the present disclosure.

The CPU executes the distance measurement program in such a way as to realize each of the projection pattern control unit 31, the image acquisition unit 32, the distance calculation unit 33, the validity determination unit 34, the repetition control unit 35, and the parameter storage unit 36.

The projection pattern control unit 31 can generate projection patterns and store the generated projection patterns in the storage device beforehand. Further, the projection pattern control unit 31 can read projection pattern data from the storage device, together with a validity determination result (described below), if necessary, and can transmit the projection pattern data to the projection unit 1 via a general display interface (e.g., a digital visual interface (DVI) or the like). Further, the projection pattern control unit 31 is functionally operable as a unit configured to control an operation to be performed by the projection unit 1 via a general communication interface (e.g., RS232C or IEEE488). The projection unit 1 can display a projection pattern on the display element 13 based on the received projection pattern data. For example, a gray code obtainable according to a space coding method or a sine-wave pattern obtainable according to a phase shift method are usable as measurement patterns to be projected.

The image acquisition unit 32 can receive a sampled and quantized digital image signal from each imaging unit 2A or 2B. Further, the image acquisition unit 32 is functionally operable as a unit configured to acquire image data, which can be represented as a luminance value (i.e., density value) of each pixel, from the received image signal and store the acquired image data in the memory. The image acquisition unit 32 is functionally operable as a unit configured to control an operation (e.g., image capturing timing) to be performed by the imaging unit 2A or 2B via a general communication interface (e.g., RS232C or IEEE488).

The image acquisition unit 32 and the projection pattern control unit 31 can perform operations in cooperation with each other. Upon completion of the pattern display on the display element 13, the projection pattern control unit 31 transmits a signal to the image acquisition unit 32. In response to the signal received from the projection pattern control unit 31, the image acquisition unit 32 causes the imaging unit 2A or 2B to start an image capturing operation.

Upon completing the image capturing operation, the image acquisition unit 32 transmits a signal to the projection pattern control unit 31. In response to the signal received from the image acquisition unit 32, the projection pattern control unit 31 selects the next projection pattern as the projection pattern to be displayed on the display element 13. The image acquisition unit 32 and the projection pattern control unit 31 sequentially repeat the above-mentioned operations to complete the image capturing operation for all projection patterns.

The distance calculation unit 33 can calculate a distance between the measuring target object 4 and the projection unit 1 or the imaging unit 2A or 2B based on a captured image of a distance measurement pattern and parameters stored in the parameter storage unit 36.

The validity determination unit 34 can determine validity (indicating whether the distance measurement value is accurate and reliable) for each point or area. Further, the validity determination unit 34 can transmit a validity determination result to the parameter storage unit 36 to update the pattern to be projected based on the validity determination result.

The repetition control unit 35 is functionally operable as a control unit configured to repeat the above-mentioned sequential processing, including projecting a pattern on the measuring target object 4, calculating a distance based on an image capturing result, determining validity of a distance calculation result, and updating the projection pattern based on a validity determination result, until the termination determination condition is satisfied. In the first exemplary embodiment, the repetition control unit 35 terminates the above-mentioned sequential processing if the number of repetitions reaches a predetermined number that can be arbitrarily designed by a user.

The parameter storage unit 36 stores parameters that are used to calculate a distance in a three-dimensional space. The parameters include device parameters relating to the projection unit 1 and the imaging units 2A and 2B, internal parameters relating to the projection unit 1 and the imaging units 2A and 2B, external parameters relating to the projection unit 1 and the imaging units 2A and 2B, and projection pattern parameters. Further, the parameter storage unit 36 can store the validity determination result obtained by the validity determination unit 34 and is usable when the projection pattern control unit 31 updates the projection pattern.

The device parameters relating to the projection unit 1 and the imaging units 2A and 2B are, for example, total number of pixels that constitute the display element 13 and total number of pixels that constitute the image sensor 22. The internal parameters relating to the projection unit 1 and the imaging units 2A and 2B are, for example, focal length, image center, and image distortion coefficient. The external parameters relating to the projection unit 1 and the imaging units 2A and 2B are, for example, translation matrix and rotation matrix that indicate a positional relationship between the projection unit 1 and the imaging units 2A and 2B. The projection pattern parameters are, for example, information about distance measurement patterns and information about quenching/dimming mask patterns. The validity determination result indicates whether a pixel of the display element 13 is valid or invalid.

In the present exemplary embodiment, each of the projection unit 1 and the imaging units 2A and 2B is approximated as a pinhole camera. However, the camera model to which the present disclosure is applied is not limited to pinhole cameras.

Figure 2:
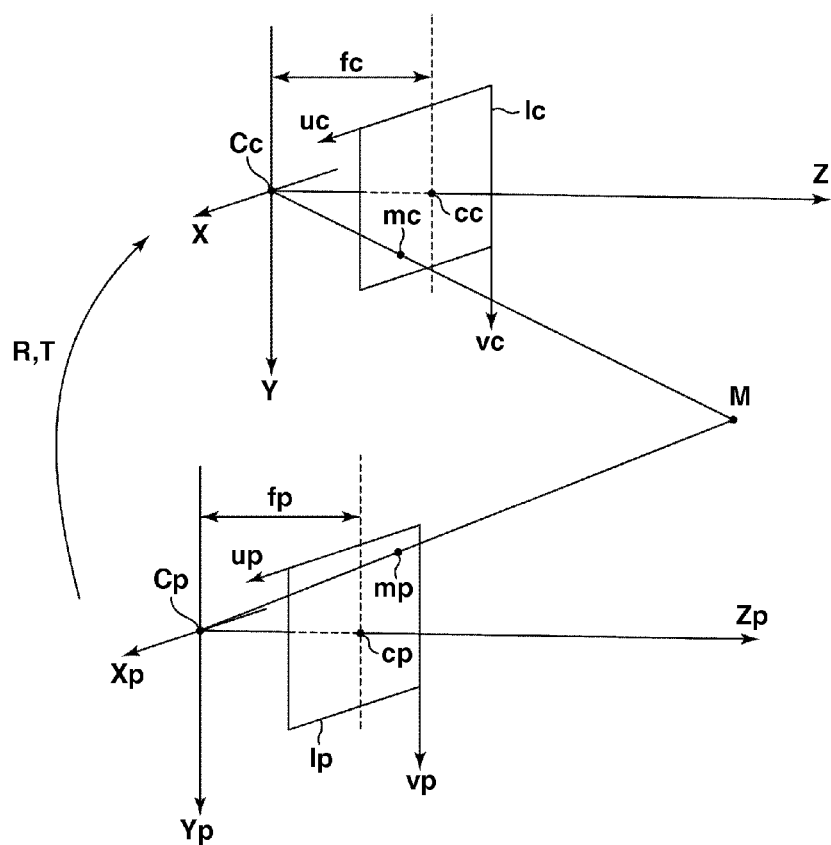
FIG. 2 illustrates a principle of distance measurement based on a triangulation method.

The principle of a triangulation-based distance measuring method is described below with reference to FIG. 2. In FIG. 2, Cc represents the lens center of the imaging unit, Ic represents an image plane of the imaging unit, fc represents the focal length of the imaging unit, (uco, vco) represents pixel coordinates of the image center cc, and Psc represents the pixel size of the image sensor. The following formula (1) expresses an internal matrix Ac of the imaging unit.

$$Ac = \begin{bmatrix} fc/Psc & 0 & uco \\ 0 & fc/Psc & vco \\ 0 & 0 & 1 \end{bmatrix} \quad (1)$$

Further, Cp represents the lens center of the projection unit, Ip represents an image plane of the projection unit, fp represents the focal length of the projection unit, (upo, vpo) represents pixel coordinates of the image center cp, and Psp represents the pixel size of the display element. The following formula (2) expresses an internal matrix Ap of the projection unit.

$$Ap = \begin{bmatrix} fp/Psp & 0 & uco \\ 0 & fp/Psp & vco \\ 0 & 0 & 1 \end{bmatrix}. \quad (2)$$

The internal matrix Ac of the imaging unit and the internal matrix Ap of the projection unit can be calculated using an internal parameter calibration method (which is conventionally known).

The external parameters that represent a positional relationship between a camera coordinate system XYZ of the imaging unit and a camera coordinate system XpYpZp of the projection unit are rotation matrix R and translation matrix T. The rotation matrix R is a 3×3 matrix. The translation matrix T is a 3×1 matrix. The rotation matrix R and the translation matrix T can be calculated using a conventionally known method for calibrating the external parameters.

Coordinate values (X, Y, Z) represent a point M in a three-dimensional space, which has an origin positioned in the camera coordinate system for the imaging unit. Pixel coordinate values (uc, vc) represent a projection point Mc of the point M projected on an image plane Ic of the imaging unit. The following formula (3) expresses the above-mentioned correspondence relationship.

$$s \begin{bmatrix} uc \\ vc \\ 1 \end{bmatrix} = [Ac\ 0] \begin{bmatrix} X \\ Y \\ Z \\ 1 \end{bmatrix} = \begin{bmatrix} C_{11} & C_{12} & C_{13} & C_{14} \\ C_{21} & C_{22} & C_{23} & C_{24} \\ C_{31} & C_{32} & C_{33} & C_{34} \end{bmatrix} \begin{bmatrix} X \\ Y \\ Z \\ 1 \end{bmatrix} \quad (3)$$

In the following formula (3), s represents a scalar. Further, pixel coordinate values (up, vp) represent a projection point Mp of the point M projected on an image plane Ip of the projection unit. The following formula (4) expresses the above-mentioned correspondence relationship.

$$s' \begin{bmatrix} up \\ vp \\ 1 \end{bmatrix} = \begin{bmatrix} R & T \\ 0 & 1 \end{bmatrix} [Ap\ 0] \begin{bmatrix} X \\ Y \\ Z \\ 1 \end{bmatrix} = \begin{bmatrix} P_{11} & P_{12} & P_{13} & P_{14} \\ P_{21} & P_{22} & P_{23} & P_{24} \\ P_{31} & P_{32} & P_{33} & P_{34} \end{bmatrix} \begin{bmatrix} X \\ Y \\ Z \\ 1 \end{bmatrix}. \quad (4)$$

In the formula (4), s' represents a scalar. The following formula (5) including four simultaneous equations can be obtained by developing the above-mentioned formulae (3) and (4).

$$\begin{aligned} (C_{11} - C_{31}uc)X + (C_{12} - C_{32}uc)Y + (C_{13} - C_{33}uc)Z &= C_{34}uc - C_{14} \\ (C_{21} - C_{31}vc)X + (C_{22} - C_{32}vc)Y + (C_{23} - C_{33}vc)Z &= C_{34}vc - C_{24} \\ (P_{11} - P_{31}up)X + (P_{12} - P_{32}up)Y + (P_{13} - P_{33}up)Z &= P_{34}up - P_{14} \\ (P_{21} - P_{31}vp)X + (P_{22} - P_{32}vp)Y + (P_{23} - P_{33}vp)Z &= P_{34}vp - P_{24} \end{aligned} \quad (5)$$

The pixel coordinate values (uc, vc) representing the point Mc and the pixel coordinate values (up, vp) representing the point Mp can be obtained using an appropriate pattern projection method described in the background art. Further, Cij (i=1 to 3 and j=1 to 4) and Pij (i=1 to 3 and j=1 to 4) can be calculated using internal matrices and external parameters and, therefore, can be obtained beforehand based on calibration. In the formula (5), only the coordinate values (X, Y, Z) of the point M are unknown values. The coordinate values (X, Y, Z) can be obtained by solving the simultaneous equations. The number of the coordinate values (X, Y, Z) of the point M, i.e., the number of unknown values to be obtained, is three. Therefore, the coordinate values of the point M can be calculated by obtaining any one of the pixel coordinate values (up, vp) of the projection unit. As mentioned above, the distance measurement can be realized based on the triangulation-based method.

In the first exemplary embodiment, it is presumed that each of two cameras serves as an imaging unit. The apparatus performs distance measuring processing for each of the projection unit 1 and the imaging units 2A and 2B according to the above-mentioned triangulation-based distance measuring method. Further, if pixel coordinate values of the other imaging unit are taken into consideration instead of using the pixel coordinate values (up, vp) of the point Mp corresponding to the projection unit, it is possible to acquire a correspondence relationship between two imaging units 2A and 2B based on the triangulation-based distance measuring method. Therefore, the distance measuring apparatus can obtain three distance measurement results, i.e., a distance calculated using the projection unit 1 and the imaging unit 2A, a distance calculated using the projection unit 1 and the imaging unit 2B, and a distance calculated using the imaging unit 2A and the imaging unit 2B. However, a pixel correspondence between two imaging units can be acquired, for example, with reference to the correspondence relative to the projection unit. However, the correspondence acquisition method is not limited to the above-mentioned example. An appropriate twin-stereo matching method (e.g., a method discussed in the following literature) is usable to acquire the relationship between two imaging units 2A and 2B.

D. Scharstein and R. Szeliski, "A taxonomy and evaluation of dense two-frame stereo correspondence algorithms," IJCV, vol. 47, no. 1, 2002

Figure 3:
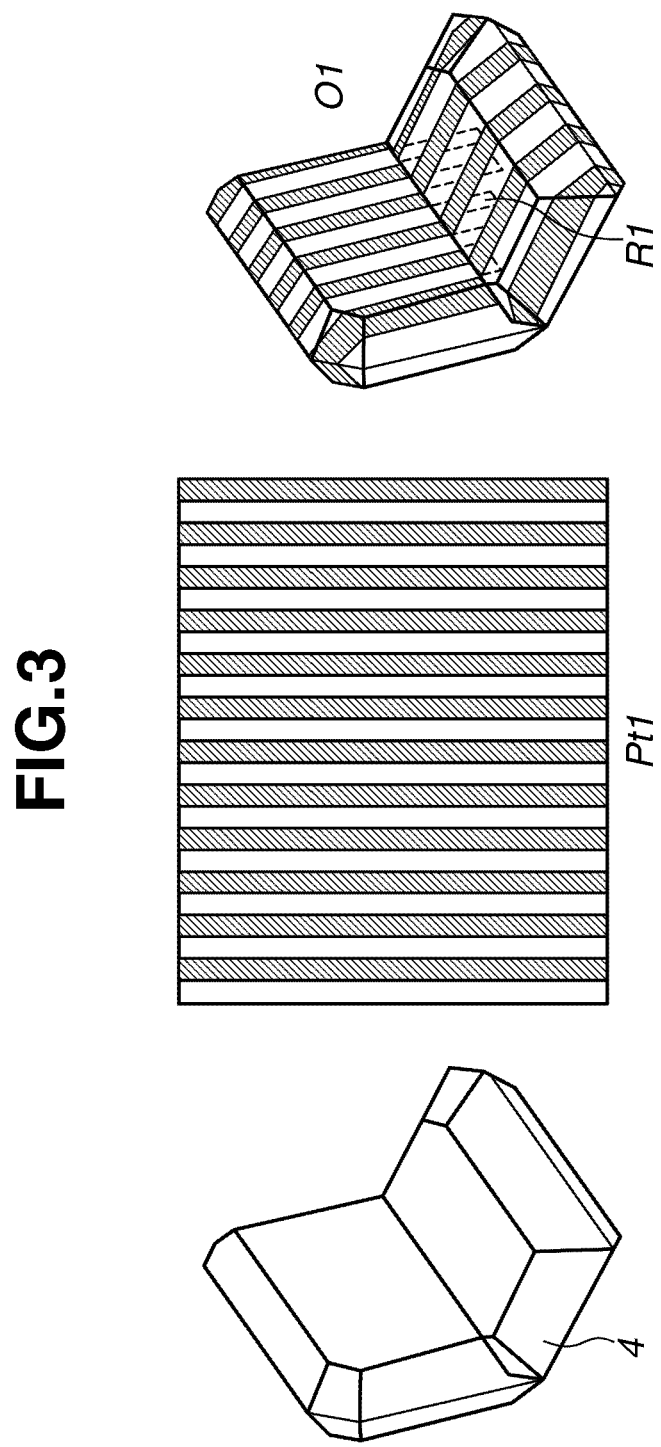
FIG. 3 illustrates an example of a measuring target object influenced by multiple reflections.

If multiple reflections of light do not occur or the influence thereof is negligible, it is feasible to measure the distance of a measuring target object according to the above-mentioned triangulation method. However, if the multiple reflections of light are influential, an error may occur in the measurement. For example, as illustrated in FIG. 3, in a case where a light pattern Pt1 is projected on the measuring target object 4, the imaging unit obtains an observation result O1, which includes a portion R1 influenced by the multiple reflections.

The mechanism of generating a measurement error due to multiple reflections of light is described in detail below with reference to FIG. 4. To simplify the following description, a two-dimensional sectional view defined with two (X and Z) axes is employed in FIG. 4.

A beam L1 emitted from the lens center Cp of the projection unit 1 travels in such a way as to pass through a point up1 on the image plane Ip and to reach a point P1 on the measuring target object 4. The light reflected at the point P1 intersects an image coordinate plane of the imaging unit 2A or 2B at a point uc1 and reaches the lens center Cc.

A beam L2 emitted from the lens center Cp of the projection unit 1 travels in such a way as to pass through a point up2 on the image plane Ip and to reach a point P2 on the measuring target object 4. The light reflected at the point P2 is then secondarily reflected at the point P1. Subsequently, the light reflected at the point P1 intersects the image coordinate plane of the imaging unit 2A or 2B at the point uc1 and reaches the lens center Cc of the imaging unit 2A or 2B. When the secondary reflection occurs, the light emitted from the lens center Cp of the projection unit 1 can be recognized as if it is emitted from the point P2.

In a case where the multiple reflections are less influential because the glossiness of a measuring target object is low, the reflection light of the beam L1 becomes dominant when the luminance is observed by the imaging unit 2A or 2B. The pixel coordinate values (i.e., the point up1) can be accurately detected. Therefore, an accurate distance measurement result Zt can be acquired.

On the other hand, in a case where the multiple reflections are greatly influential because the glossiness of a measuring target object is high and the reflection light is observed in the regular reflection direction, in which the reflection angle becomes equal to the incident angle, the reflection light of the beam L2 becomes dominant. In this case, the pixel coordinate values (i.e., the point up2) are erroneously detected. In other words, a measurement point Pe is erroneously measured and a distance measurement result Ze is obtained. Thus, the measurement causes an error $\Delta Z$ (=Zt−Ze).

Figure 4:
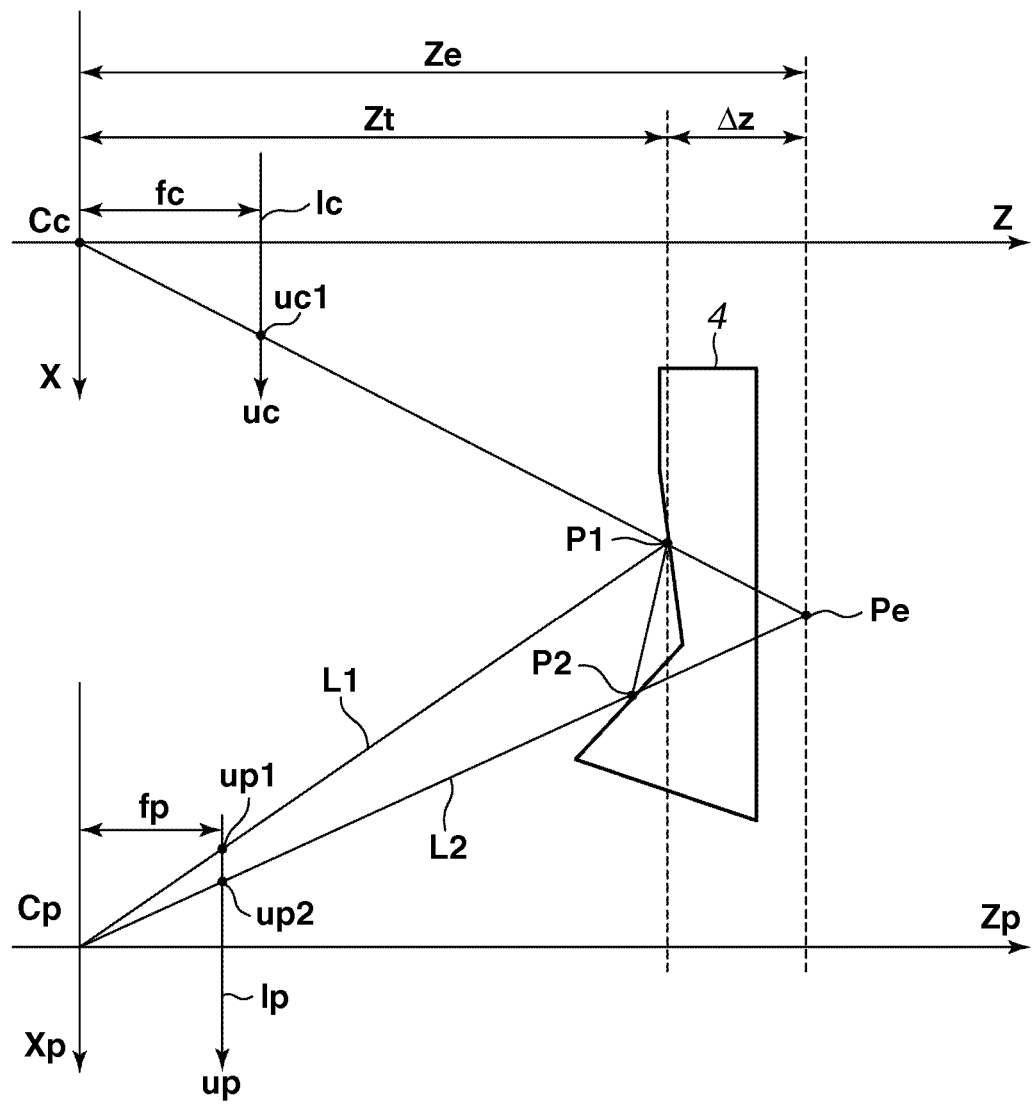
FIG. 4 illustrates a mechanism of generating a measurement error due to multiple reflections of light.

In practice, not only the secondary reflection of light illustrated in FIG. 4 but also tertiary or more higher-order reflection of light may occur. Thus, the measurement errors may become more complicated. As mentioned above, a measurement error may occur due to multiple reflections of light.

In view of the foregoing, the distance measuring apparatus according to the present disclosure quenches or dims a projection pattern portion that corresponds to an area determined as being valid in measured distance, when designated by the validity determination unit because it is not influenced by the multiple reflections. Further, the distance measuring apparatus repetitively performs sequential processing including projection, imaging, distance measurement, and determination with an updated pattern, thereby enlarging an area in which the measurement can be accurately performed while suppressing generation of multiple reflections.

Figure 5:
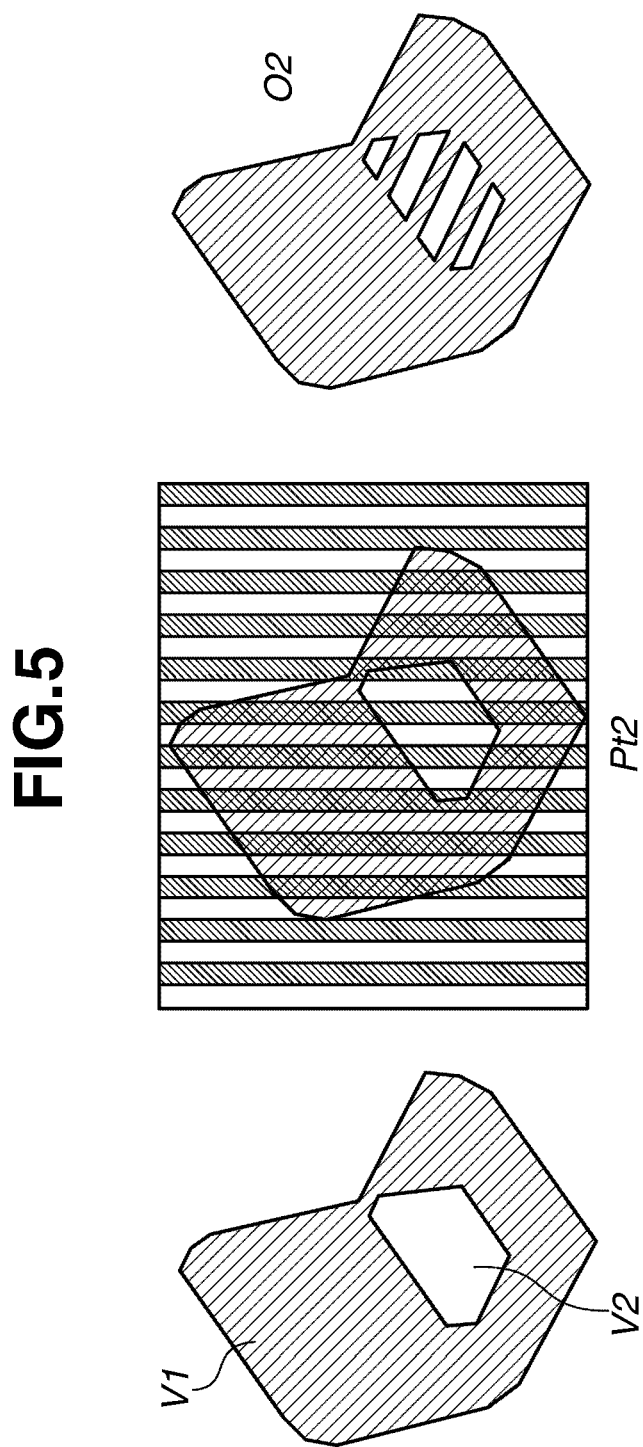
FIG. 5 illustrates an example of a projection pattern including a quenched part.

FIG. 5 illustrates an example of a projection pattern including a quenched part, in which V1 represents an area determined by the validity determination unit as being valid when a three-dimensional measurement is performed using the observation image O1 illustrated in FIG. 3. On the other hand, V2 represents an area determined as being invalid due to the influence caused by multiple reflections. The projection pattern updating processing includes obtaining an updated pattern group Pt2 illustrated in FIG. 5 by quenching or dimming the area V1 (i.e., the area determined as being valid) of the measuring target object from the pattern group Pt1 illustrated in FIG. 3. An observation image O2 can be obtained when the projection and imaging processing are performed again with the updated projection pattern group Pt2. As a result, it becomes feasible to realize a three-dimensional measurement without being substantially influenced by multiple reflections.

Example processing according to the first exemplary embodiment, including measurement of a multiple reflection area, is described in detail below with reference to a flowchart illustrated in FIG. 6.

In step S1, the projection unit 1 projects a measurement pattern group on the measuring target object 4. Each of the imaging units 2A and 2B captures an image of the measuring target object 4. If the image capturing operation by each imaging unit is completed, the projection unit 1 projects the next measurement pattern and each of the imaging units 2A and 2B captures an image of the next measurement pattern. The projection unit 1 and the imaging units 2A and 2B repetitively perform the above-mentioned projection and imaging processing until the processing is completed for all measurement patterns included in the group. The measurement pattern is, for example, a gray code, although the measurement pattern is not limited to a specific code. The captured image data is transmitted to the image acquisition unit 32.

In step S2, the distance measuring apparatus calculates three distance measurement results, i.e., the distance calculated using the projection unit 1 and the imaging unit 2A, the distance calculated using the projection unit 1 and the imaging unit 2B, and the distance calculated using the imaging unit 2A and the imaging unit 2B, based on the captured image, using the above-mentioned triangulation method, for each area.

In step S3, the distance measuring apparatus determines whether the distance measurement result in each area is valid based on the above-mentioned three distance measurement values. If it is determined that there is a coincidence between respective distance measurement values in each area, it can be determined that the distance measurement result is not influenced by multiple reflections and can be regarded that the obtained measurement result is valid. Multiple reflections, if occur on a measuring target object having higher glossiness, have an influence variable depending on the direction of each viewpoint selected in the observation. Therefore, if the measuring target object is observed by a different imaging unit (from a different viewpoint), the presence of any adverse influence if caused by multiple reflections can be recognized. Further, if there is not any coincidence between the above-mentioned three distance measurement values due to other influence (e.g., randomly generated image noises), the distance measurement result is regarded as being invalid.

However, even in a state where there is not any influence caused by multiple reflections and image noises, distance measurement values obtained by a plurality of distance measurement systems may not have any perfect coincidence. If the actual state differs from an ideal state (i.e., a simulation), internal/external parameters obtained beforehand by calibration for the projection unit and the imaging unit may include tiny errors. The internal/external parameters for the projection unit and the imaging unit are used in calculating distance values as mentioned above with respect to principle of triangulation. Therefore, errors if contained in the internal/external parameters appear as errors in obtained distance measurement values.

In general, it is difficult to remove or correct a calibration error unless the calibration is newly performed. Therefore, in a case where a calibration error causes a discordance between distance measurement values obtained by a plurality of distance measurement systems, it is useful to designate the position and orientation of a specific projection unit and a specific imaging unit (e.g., the projection unit 1 and the imaging unit 2A) as calibration standards and set a permissible range. Although the above-mentioned standards may differ from true values, removing or correcting the calibration error is difficult. Therefore, the above-mentioned method for determining coincidence/discordance between distance measurement values is considered appropriate. More specifically, the method includes performing projection again for calibration data using the obtained internal/external parameters, calculating an error in a distance measurement result obtained by the calibration, and determining a permissible range from the standards (i.e., the range in which the distance measurement values can be regarded as being coincident with each other) based on the calculated error. Further, in this case, the distance cannot be fixed to only one measurement value. Therefore, it is useful to designate values in a reference system as representative values. However, the method is not limited to the above-mentioned example. Another method using a mean value or a median as a representative value is employable.

In step S4, the distance measuring apparatus updates the projection pattern in such a way as to quench or dim a partial area of the projection pattern that corresponds to an area regarded as being valid with respect to the distance measurement value, based on the validity determination result. The area regarded as being valid with respect to the distance measurement value is an area in which a desired distance measurement value can be obtained. In other words, repetitively performing the distance measuring processing for the above-mentioned area is unnecessary. The distance measuring apparatus quenches or dims the light pattern that is projected on the above-mentioned area. In a case where the light pattern reflected at the above-mentioned area causes multiple reflections (namely, illuminates another surface of the measuring target object), removing adverse influence that may be caused by multiple reflections is feasible by projecting an updated projection pattern in the next repetitive processing. However, the method for updating the projection pattern is not limited to the above-mentioned quenching or dimming processing. Any other method for reducing the influence of light that illuminates the area regarded as being valid is employable. For example, it is useful to brighten a projection pattern portion that corresponds to an area determined as being invalid with respect to the distance measurement value.

In step S5, the distance measuring apparatus determines whether the termination determination condition is satisfied. If it is determined that the termination determination condition is satisfied (YES in step S5), the operation proceeds to step S6. If it is determined that the termination determination condition is not satisfied (NO in step S5), the operation returns to step S1. The distance measuring apparatus repeats the processing using the projection pattern updated in step S4. In the first exemplary embodiment, it is presumed that the termination determination condition is "repeating the processing N times (i.e., an arbitrarily designated number of times)." Accordingly, if it is determined that the number of repetitions is equal to or less than N−1, the operation returns to step S1. If it is determined that the number of repetitions is equal to N, the operation proceeds to step S6. Performing the repetitive processing a plurality of times is effective to remove the influence of three or more reflections or reduce the influence of image noises. Further, the number of repetitions (including only one repetition) can be arbitrarily designated. Thus, the distance measuring apparatus can perform processing according to actual cycle time.

When the operation returns to step S1, the distance measuring apparatus repeats the above-mentioned sequential processing (see steps S1 to S4) including projecting the projection pattern group updated in step S4 and capturing an image of the updated pattern group, then in step S5, the distance measuring apparatus determines whether the termination determination condition is satisfied. The distance measuring apparatus repeats the above-mentioned processing until the termination determination condition is satisfied.

In step S6, the distance measuring apparatus integrates distance measurement results. While performing the repetitive processing, the distance measuring apparatus stores a distance measurement value obtained in an area if the area is newly regarded as being valid with respect to the distance measurement value. If the area is once regarded as being valid, the distance measuring apparatus stores the obtained distance measurement value while associating it with the area and no longer designates the area as a target to be subjected to the repetitive processing. Accordingly, if an area is newly regarded as being valid with respect to the distance measurement value in the i-th repetitive processing, the distance measuring apparatus stores a distance measurement value obtained in this area. Then, in step S6, the distance measuring apparatus obtains a distance measurement value with respect to the measuring target object by integrating N pieces of distance measurement result data. However, the present disclosure is not limited to the above-mentioned example. For example, it is useful that the distance measuring apparatus adds a distance measurement value, if it is detected in an area newly determined as being valid with respect to the distance measurement value, to the distance measurement result data at appropriate timing (e.g., at the processing timing of step S5) during the repetitive processing. In this case, the distance measurement result is already integrated at the time when the operation proceeds to step S6.

Figure 6:
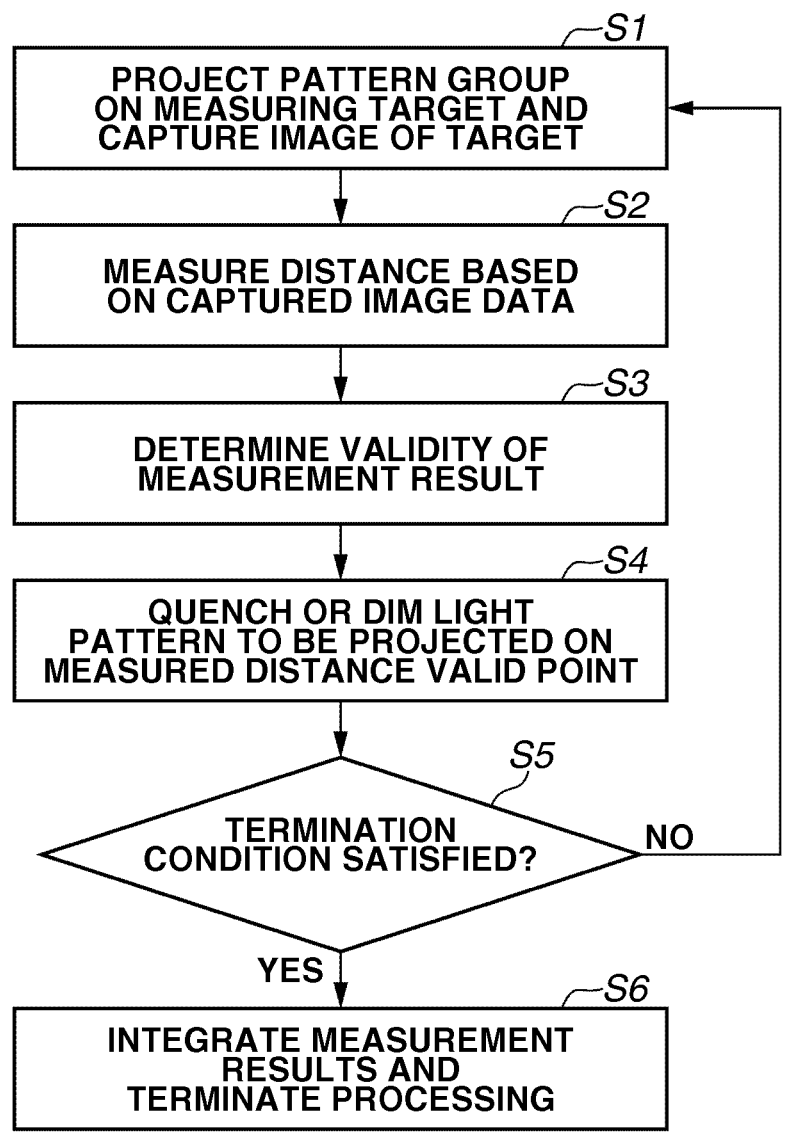
FIG. 6 is a flowchart illustrating processing that can be performed by the distance measuring apparatus according to the first exemplary embodiment.

As mentioned above, the distance measuring apparatus completes the processing of the flowchart illustrated in FIG. 6.

According to the first exemplary embodiment, the distance measuring apparatus quenches or dims a pixel of a projection pattern that corresponds to an area in which a valid distance measurement value can be obtained without being influenced by multiple reflections. In other words, the distance measuring apparatus increases the valid distance value measurable area through repetitive processing while suppressing adverse influence to be caused by multiple reflections.

In the first exemplary embodiment, the distance measuring apparatus uses two imaging units. However, the present disclosure is not limited to the above-mentioned example. It is useful to provide an arbitrary number of (three or more) imaging units. In this case, three or more distance measurement results are obtainable. However, it is unnecessary to calculate distance measurement results for all combinations of the projection unit and the imaging unit. It is useful to perform distance measuring processing only for a limited number of (a total of M) combinations according to the triangulation method. Further, in the validity determination processing to be performed in step S3, it is not necessary to confirm complete coincidence among all of M pieces of distance measurement data. If a predetermined number of (or a predetermined ratio of) distance measurement values are coincident with each other, it can be regarded that all of the distance measurement values are valid.

The distance measuring apparatus according to the first exemplary embodiment of the present disclosure has a characteristic configuration as mentioned above.

Figure 7:
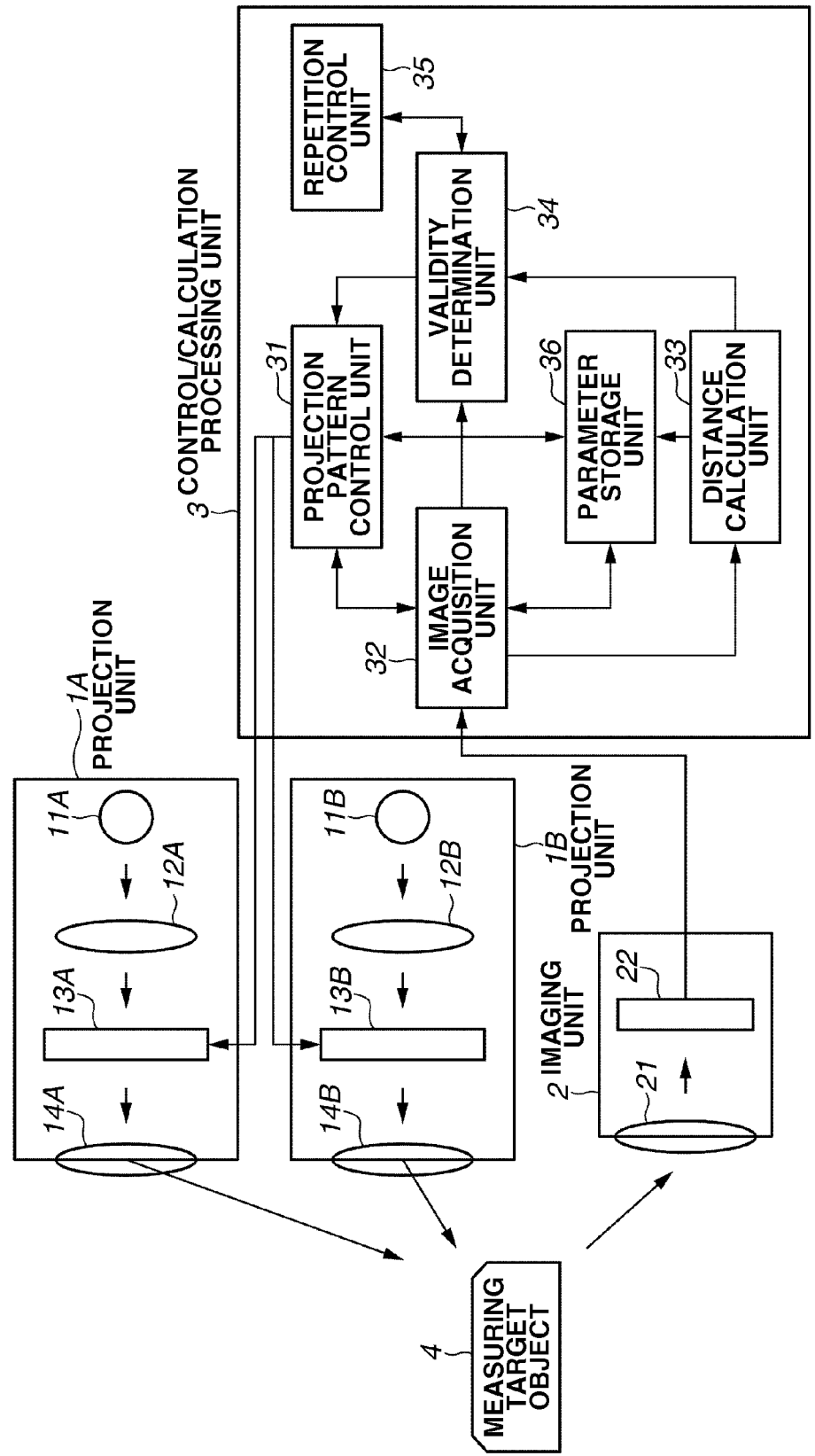
FIG. 7 illustrates the configuration of a distance measuring apparatus according to a second exemplary embodiment.

A distance measuring apparatus according to a second exemplary embodiment includes two projection units and a single imaging unit, which are cooperative with each other as a validity determination unit configured to perform three-dimensional measuring processing and determine whether a measured distance of a target area is valid. FIG. 7 illustrates a schematic configuration of the distance measuring apparatus according to the second exemplary embodiment. The distance measuring apparatus illustrated in FIG. 7 is substantially similar to the apparatus illustrated in FIG. 1, although two projection units (i.e., projection units 1A and 1B) and only one imaging unit (i.e., an imaging unit 2) are provided in the present exemplary embodiment. A flowchart according to the second exemplary embodiment is substantially similar to the flowchart (see FIG. 6) described in the first exemplary embodiment. Therefore, redundant description thereof will be avoided if processing content is similar to that already described. Processing to be performed in step S1 (i.e., step containing different processing content) is described below.

In the second exemplary embodiment, in step S1, each of the projection units 1A and 1B projects a measurement pattern group on the measuring target object 4 and the imaging unit 2 captures an image of the measuring target object 4. In the present exemplary embodiment, the projection units 1A and 1B successively emit patterns in such a way as to enable the imaging unit 2 to identify each pattern when it captures an image of the pattern. However, the processing to be performed in step S1 is not limited to the above-mentioned example. For example, as an example multiplexing of the light source, it is useful to use different colors for respective light patterns to be emitted from the projection units 1A and 1B. Processing to be performed after the imaging unit 2 completes the image capturing operation is similar to that described in the first exemplary embodiment. Therefore, redundant description thereof will be avoided.

An application of the triangulation method in the present exemplary embodiment is supplementarily described below.

In the second exemplary embodiment, the distance measuring apparatus performs the above-mentioned triangulation-based distance measuring processing for each of two projection units 1A and 1B and the imaging unit 2. Further, it is feasible to perform distance measuring processing for the projection units 1A and 1B based on the triangulation method by taking a correspondence relationship between pixel coordinate values of two projection units into consideration, instead of using pixel coordinate values (uc, vc) of the point Mc corresponding to the imaging unit. Therefore, the distance measuring apparatus can obtain three distance measurement results, i.e., a distance calculated using the projection unit 1A and the imaging unit 2, a distance calculated using the projection unit 1B and the imaging unit 2, and a distance calculated using the projection unit 1A and the projection unit 1B. However, the pixel correspondence between two projection units can be acquired by referring to the correspondence between the projection unit and the imaging unit.

After obtaining three distance measurement results as mentioned above, the distance measuring apparatus can perform processing in steps S2 to S6 in the manner described in the first exemplary embodiment. Therefore, redundant description thereof will be avoided.

The example configuration described in the second exemplary embodiment includes two projection units. However, the present disclosure is not limited to the above-mentioned example. Similar to the first exemplary embodiment, it is useful to provide an arbitrary number of projection units.

The distance measuring apparatus according to the second exemplary embodiment of the present disclosure has a characteristic configuration as mentioned above.

Figure 8:
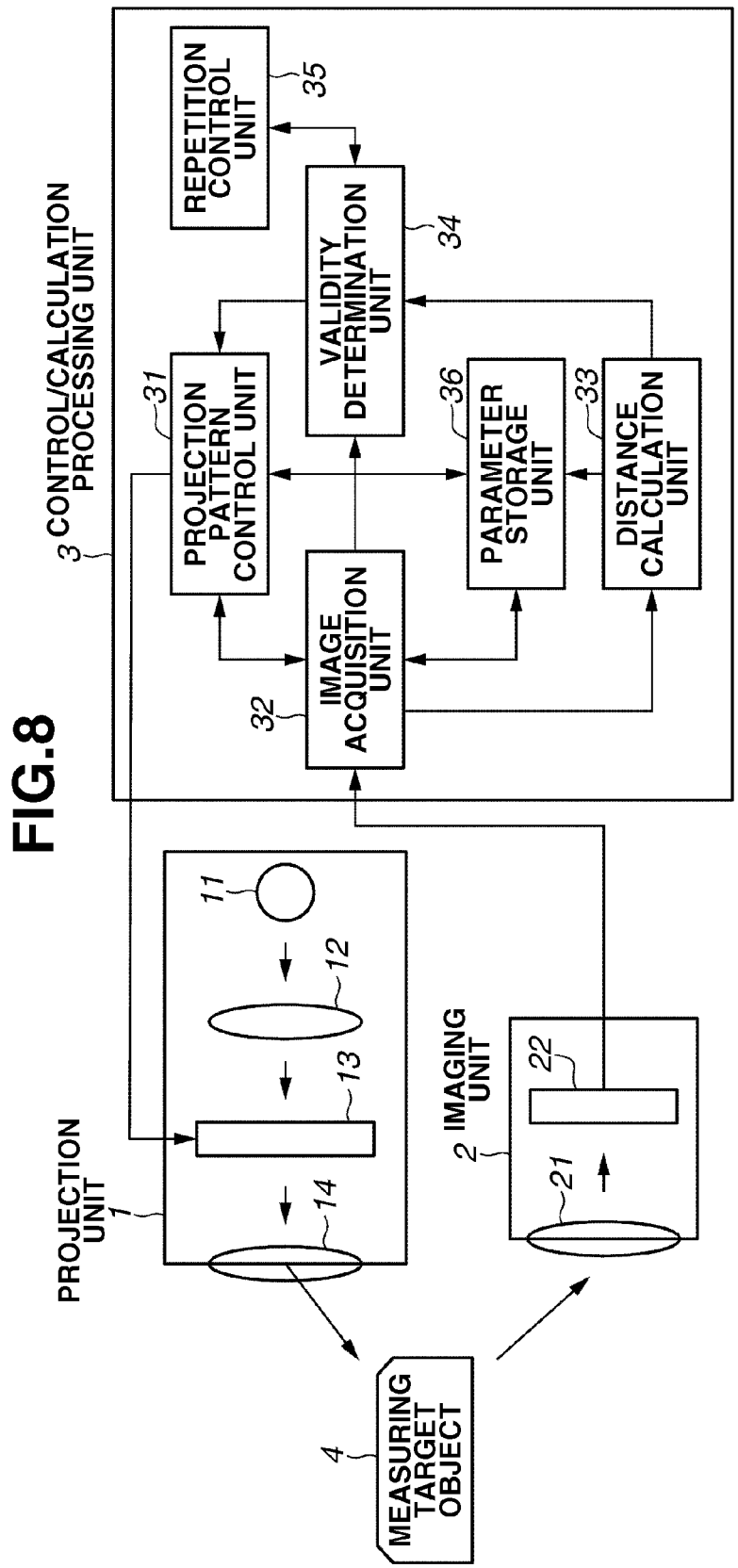
FIG. 8 illustrates the configuration of a distance measuring apparatus according to a third exemplary embodiment.

A distance measuring apparatus according to a third exemplary embodiment includes a single projection unit and a single imaging unit, which are cooperative with each other as a validity determination unit configured to perform three-dimensional measuring processing with a plurality of different projection pattern groups and determine whether a measured distance of a target area is valid. FIG. 8 illustrates a schematic configuration of the distance measuring apparatus according to the third exemplary embodiment. The distance measuring apparatus illustrated in FIG. 8 is substantially similar to the apparatus illustrated in FIG. 1 (as described in the first exemplary embodiment) and the apparatus illustrated in FIG. 6 (as described in the second exemplary embodiment), although only one projection unit (i.e., projection unit 1) and only one imaging unit (i.e., imaging unit 2) are provided in the present exemplary embodiment. A flowchart according to the third exemplary embodiment is substantially similar to the flowchart (see FIG. 6) described in the first exemplary embodiment. Therefore, redundant description thereof will be avoided if processing content is similar to that already described. Processing to be performed in step S1 and step S3 (i.e., steps each containing different processing content) is described below.

In the third exemplary embodiment, in step S1, the projection unit 1 sequentially projects a plurality of different measurement pattern groups on the measuring target object 4 and the imaging unit 2 sequentially captures an image of the measuring target object 4. In this case, for example, a gray code and any other appropriate code (e.g., XOR-04 code and gray code with maximum min-SW described in the following literature) are usable as different measurement patterns. Further, phase shift patterns mutually different in period are usable. When a different measurement pattern group is used, multiple reflections cause a different influence. Therefore, in an area in which multiple reflections occur, the distance measurement value is variable depending on a projection pattern group. In the step S3, the validity determination unit can determine whether a measured distance of a target area is valid by confirming if respective distance measurement values coincide with each other.

M. Gupta, A. Agrawal, A. Veeraraghavan, and S. G. Narasimhan, "Structured light 3D scanning in the presence of global illumination," CVPR2011, pp 713-720, 2011

In the first exemplary embodiment, the processing to be performed in step S3 has been described on the assumption that three distance measurement values do not completely coincide with each other due to a calibration error. However, only one projection unit and only one imaging unit are provided in the third exemplary embodiment. Therefore, a calibration error causes no discordance. Therefore, the distance measuring apparatus can perform validity determination processing using the calculated distance measurement value itself.

An application of the triangulation method in the present exemplary embodiment is supplementarily described below.

The example configuration described in the third exemplary embodiment includes one projection unit and one imaging unit, which cooperatively perform distance measuring processing for each of a plurality of different projection pattern groups based on the above-mentioned triangulation method. Therefore, the number of obtainable distance measurement results is equal to the number of different projection pattern groups. After obtaining a plurality of distance measurement values as mentioned above, the distance measuring apparatus can perform processing in steps S2 to S6 in the manner described in the first exemplary embodiment. Therefore, redundant description thereof will be avoided.

The distance measuring apparatus according to the third exemplary embodiment of the present disclosure has a characteristic configuration as mentioned above.

A distance measuring apparatus according to a fourth exemplary embodiment includes a single projection unit and a single imaging unit, which are cooperative with each other as a validity determination unit configured to perform three-dimensional measuring processing with a set of projection pattern group and determine whether a measured distance of a target area is valid with reference to information relating to the shape of a measuring target object. The distance measuring apparatus according to the fourth exemplary embodiment has a configuration similar to that (see FIG. 8) described in the third exemplary embodiment. Therefore, redundant description thereof will be avoided. A flowchart according to the fourth exemplary embodiment is substantially similar to the flowchart (see FIG. 6) described in the third exemplary embodiment. Therefore, redundant description thereof will be avoided if processing content is similar to that already described. Processing to be performed in step S1 and step S3 (i.e., steps each containing different processing content) is described below.

In the fourth exemplary embodiment, in step S1, only one measurement pattern group is projected because the configuration including only one projection unit and only one single imaging unit is similar to that described in the third exemplary embodiment.

In the first to third exemplary embodiments, the validity determination processing in step S3 is determining whether a plurality of distance measurement values coincides with each other. In the fourth exemplary embodiment, the validity determination unit uses information about the shape of a measuring target object in the validity determining processing. For example, when a CAD model of a measuring target object is already known, the validity determination unit performs positioning relative to a distance measurement value and determines that a target area, if an error relative to the CAD model is equal to or less than a threshold value, as being valid with respect to the distance measurement value. However, the above-mentioned validity determination method is usable only when there is not any deviation in position and orientation between the CAD model and a distance measurement result and there is a significant influence caused by a shape measurement error. If there is any deviation in position and orientation of the CAD model, it is desired to perform the positioning again for the CAD model using a point where a distance measurement result is highly reliable and perform the validity determination processing in such a way as to reduce the deviation in position and orientation as much as possible. The way of selecting a highly reliable point is not limited to a specific method. For example, a user can designate an arbitrary point or can select an appropriate point based on luminance information of an image in which the selected point is observed.

In the fourth exemplary embodiment, the validity determination method using a CAD model of a measuring target object has been described. However, the present disclosure is not limited to the above-mentioned example. If a measuring target object is constituted by planes only, it is useful to determine the validity of each distance measurement result by inspecting the flatness for each area. Further, it is useful to determine the validity of each distance measurement result based on a distribution of lines and curvatures included a measuring target object or edge position information, if such information is obtainable.

The distance measuring apparatus according to the fourth exemplary embodiment of the present disclosure has a characteristic configuration as mentioned above.

A distance measuring apparatus according to a fifth exemplary embodiment includes a single projection unit and a single imaging unit, which are cooperative with each other as a validity determination unit configured to perform three-dimensional measuring processing with a measurement projection pattern and then project a multiple reflection determination pattern to check the presence of multiple reflections. Further, the distance measuring apparatus determines whether a measured distance of a target area is valid. The distance measuring apparatus according to the fifth exemplary embodiment has a configuration similar to that (see FIG. 8) described in the third exemplary embodiment. A flowchart according to the fifth exemplary embodiment is substantially similar to the flowchart (see FIG. 6) described in the third exemplary embodiment. Therefore, redundant description thereof will be avoided if processing content is similar to that already described. Processing to be performed in step S1 and step S3 (i.e., steps each containing different processing content) is described in detail below.

In the fifth exemplary embodiment, in step S1, the projection unit projects one measurement pattern group and further projects a multiple reflection detecting pattern. In the present exemplary embodiment, the multiple reflection detecting pattern is, for example, a stripe pattern that is substantially parallel to an epipolar line on the image plane of the projection unit, which can be obtained from a geometric arrangement of the projection unit and the imaging unit. As illustrated in FIG. 9, in addition to the measurement pattern Pt1, a stripe pattern Pt3 that is substantially parallel to the epipolar line of the projection unit is projected as the multiple reflection detecting pattern on a measuring target object. In this case, an observation image O3 can be captured by the imaging unit. The primary reflection light can be observed as the same stripe pattern regardless of the depth. Further, the observation image O3 includes lines R2 that are inclined relative to the stripe pattern. These lines R2 represent secondary or more reflection light that can be observed after the projected stripe pattern is once reflected on a surface of the object. Considering the above-mentioned epipolar line characteristics, in step S3, if lines inclined relative to the stripe pattern can be observed in a target area, the distance measuring apparatus determines that multiple reflections are observed in this area. Therefore, the distance measuring apparatus regards a corresponding distance measurement value as being invalid. On the other hand, if lines parallel to the stripe pattern can be observed in a target area, the distance measuring apparatus regards a corresponding distance measurement value as being valid.

The distance measuring apparatus according to the fifth exemplary embodiment of the present disclosure has a characteristic configuration as mentioned above.

A distance measuring apparatus according to a sixth exemplary embodiment checks if a total measurement time T (which can be arbitrarily set as the termination determination condition) has elapsed in step S5. Therefore, if it is determined that the measurement time T has not yet elapsed (NO in step S5), the operation returns to step S1. The distance measuring apparatus repeats the sequential processing in steps S1 to S5 using the projection pattern updated in step S4. If it is determined that the measurement time T has elapsed (YES in step S5), the operation proceeds to step S6. A schematic configuration of the distance measuring apparatus according to the sixth exemplary embodiment is similar to the configuration (see FIG. 1) described in the first exemplary embodiment. A flowchart according to the sixth exemplary embodiment is similar to the flowchart (see FIG. 6) described in the first exemplary embodiment. Therefore, redundant description thereof will be avoided.

The distance measuring apparatus according to the sixth exemplary embodiment of the present disclosure has a characteristic configuration as mentioned above.

In a seventh exemplary embodiment, a distance measuring apparatus checks if a designated distance measurement result (which can be set as the termination determination condition) has been obtained in step S5. For example, if it is determined that the number of distance measurement points in a designated area does not exceed a predetermined value, the operation returns to step S1. The distance measuring apparatus repeats the sequential processing in steps S1 to S5 using the projection pattern updated in step S4. If it is determined that the number of distance measurement points in the designated area exceeds the predetermined value, the operation proceeds to step S6. A schematic configuration of the distance measuring apparatus according to the seventh exemplary embodiment is similar to the apparatus (see FIG. 1) described in the first exemplary embodiment. A flowchart according to the seventh exemplary embodiment is similar to the flowchart (see FIG. 6) described in the first exemplary embodiment. Therefore, redundant description thereof will be avoided.

As mentioned above, the termination determination condition employed in the seventh exemplary embodiment is checking if the number of distance measurement points in a designated area exceeds a predetermined value. However, the present disclosure is not limited to the above-mentioned example. It is useful to let a user know a distance measurement result and interactively determine whether to perform repetitive processing. It is also useful to determine whether a distance measurement result is appropriate as an input for another system.

The distance measuring apparatus according to the seventh exemplary embodiment of the present disclosure has a characteristic configuration as mentioned above.

A distance measuring apparatus according to an eighth exemplary embodiment performs determination processing in step S5 based on a comparison between a past distance measurement result and a newly obtained distance measurement result (which can be set as the termination determination condition). For example, the distance measuring apparatus compares a distance measurement result obtained through the processing repetitively performed N times with a distance measurement result obtained in the (N−1)th measuring processing. If it is determined that the number (or the ratio) of newly measured points exceeds a predetermined level, the operation returns to step S1. The distance measuring apparatus repeats the sequential processing in steps S1 to S5 using the projection pattern updated in step S4. If it is determined that the number (or the ratio) of newly measured points does not exceed the predetermined level, the operation proceeds to step S6. The distance measuring apparatus according to the eighth exemplary embodiment has a configuration similar to the apparatus (see FIG. 1) described in the first exemplary embodiment. A flowchart according to the eighth exemplary embodiment is similar to the flowchart (see FIG. 6) described in the first exemplary embodiment. Therefore, redundant description thereof will be avoided.

As mentioned above, the termination determination condition employed in the eighth exemplary embodiment is comparing a distance measurement result obtained through the processing repetitively performed N times with the distance measurement result obtained in the (N−1)th measuring processing. However, the present disclosure is not limited to the above-mentioned example. For example, it is useful to compare the newly obtained distance measurement result with an arbitrary past distance measuring processing (e.g., a distance measurement result obtained in the K-th measuring processing). Further, it is useful to use a plurality of past distance measurement results in performing the above-mentioned determination processing.

The distance measuring apparatus according to the eighth exemplary embodiment of the present disclosure has a characteristic configuration as mentioned above.

The above-mentioned second to fifth exemplary embodiments are modified examples with respect to the method for performing validity determination processing. On the other hand, the sixth to eighth exemplary embodiments are modified examples with respect to the termination determination condition in the repetitive measurement. The validity determination method and the termination determination condition are independently changeable. Therefore, any one of the second to fifth exemplary embodiments is arbitrarily combinable with the first exemplary embodiment. Similarly, any one of the sixth to eighth exemplary embodiments is arbitrarily combinable with the first exemplary embodiment.

Further, as a possible combination of the first exemplary embodiment and the second exemplary embodiment, it is feasible to use a plurality of projection units and a plurality of imaging units. Further, as a possible combination including the third exemplary embodiment, it is useful to use a plurality of projection patterns in addition to provision of a plurality of projection units and a plurality of imaging units. As mentioned above, it is useful to combine at least one of the second to fifth exemplary embodiments with the first exemplary embodiment to perform the validity determination processing. It is also useful to combine the sixth to eighth exemplary embodiments. The termination determination condition can include an AND condition or an OR condition.

In the first to eighth exemplary embodiments of the present disclosure, the measurement projection pattern is, for example, a gray code. However, the measurement projection pattern is not limited to a specific code, as mentioned above. In the present exemplary embodiment, an appropriate measurement pattern applicable to various multiple reflections is described in detail below. When a measuring target object has higher glossiness, the brightness varies depending on the direction of each reflection (e.g., primary reflection or secondary reflection). For example, light is referred to as mirror reflection component if it reflects in the regular reflection direction, in which the reflection angle becomes equal to the incident angle. The mirror reflection component is very bright compared to a diffused reflection component (i.e., another light reflected in different direction) and has a great influence on multiple reflections. The first and second exemplary embodiments of the present disclosure are excellent in suppressing the adverse influence caused by mirror reflection components. More specifically, in the first and second exemplary embodiments, a plurality of distance measurement systems is provided to observe light reflection occurring in a direction other than the regular reflection direction in such a way as to remove mirror reflection components.

On the other hand, the diffused reflection component does not have a great influence on multiple reflections. However, the three-dimensional measurement result may not be accurately obtained because it depends on the shape of a measuring target object or depends on a position/orientation relationship between the projection unit and the imaging unit. To reduce the adverse influence of the diffused reflection component in the multiple reflections, it is useful to employ a thin (i.e., high frequency) stripe pattern group, such as the XOR-04 code described in the following literature, in the measurement.

M. Gupta, A. Agrawal, A. Veeraraghavan, and S. G. Narasimhan, "Structured light 3D scanning in the presence of global illumination," CVPR2011, pp 713-720, 2011

Accordingly, a high-frequency stripe pattern group is employable as an appropriate measurement pattern group in the first and second exemplary embodiments. More specifically, the high-frequency stripe pattern group has an excellent capability of enlarging the area in which a valid distance measurement value can be obtained while suppressing the influence of mirror reflection components and diffused reflection components in multiple reflections. Therefore, the high-frequency stripe pattern group is appropriately employable in the present disclosure.

In the first exemplary embodiment, a single projection unit and a plurality of imaging units are provided to perform distance measuring processing for a multiple reflection area. The distance measuring apparatus determines the validity of each distance measurement result with reference to a plurality of distance measurement results obtained from a plurality of imaging units. Further, the distance measuring apparatus quenches or dims a projection pattern that corresponds to an area determined as being valid with respect to the distance measurement value, thereby reducing adverse influence to be caused by multiple reflections in the next measuring operation and enlarging the area in which a valid distance measurement value can be obtained. In particular, a greater number of input images can be obtained when a plurality of imaging units is provided as described in the first exemplary embodiment. This is useful in realizing a robust system and increasing the measurement accuracy.

In the second exemplary embodiment, a single imaging unit and a plurality of projection units are provided to perform distance measuring processing for a multiple reflection area. A plurality of projection units projects patterns based on multiplexing of the light source to capture a bright image of a measuring target object. It is feasible to perform accuracy measurement without being adversely influenced by current noises.

In the third exemplary embodiment, a projection unit projects different measurement pattern groups to perform distance measuring processing for a multiple reflection area. Accordingly, it is feasible to perform measuring processing with a simple hardware configuration including a single projection unit and a single imaging unit.

In the fourth exemplary embodiment, the distance measuring apparatus determines the validity of each distance measurement result based on information relating to the shape of a measuring target object and performs distance measuring processing for a multiple reflection area. Accordingly, it is feasible to perform measuring processing with a simple hardware configuration including a single projection unit and a single imaging unit. The number of images to be obtained through projection and imaging processing in a single measurement is equal to the number of measurement pattern groups.

In the fifth exemplary embodiment, the distance measuring apparatus determines the validity of each distance measurement result by projecting a multiple reflection detecting pattern and performs distance measuring processing for a multiple reflection area. Accordingly, it is feasible to perform measuring processing with a simple hardware configuration including a single projection unit and a single imaging unit. The number of images to be obtained through projection and imaging processing in a single measurement is equal to the number of measurement pattern groups and the number of multiple reflection detecting patterns. Further, an area in which multiple reflections are detectable can be easily visualized.

In the sixth exemplary embodiment, the distance measuring apparatus terminates the repetitive processing with reference to a total measurement time and performs distance measuring processing for a multiple reflection area. Accordingly, the time used to accomplish the measurement can be easily estimated. Therefore, the system is flexibly employable according to actual takt time.

In the seventh exemplary embodiment, the distance measuring apparatus terminates the repetitive processing with reference to a distance measurement result and performs distance measuring processing for a multiple reflection area. Accordingly, the distance measuring apparatus can terminate the repetitive processing immediately after completing the measurement of an intended portion. The distance measuring apparatus can efficiently terminate the measurement with reference to the purpose of measurement.

In the eighth exemplary embodiment, the distance measuring apparatus terminates the repetitive processing with reference to a past measurement result and performs distance measuring processing for a multiple reflection area. Accordingly, it is feasible to confirm the border of an area in which a measuring target object is measurable using the system in a particular measurement environment.

A distance measuring apparatus according to a ninth exemplary embodiment includes two imaging units and a single projection unit that are cooperative with each other as a determination unit configured to perform three-dimensional measuring processing to obtain a distance measurement value of a target area and determine whether the measured distance of the target area is valid, difficult to measure, or invalid. In the present exemplary embodiment, the distance measuring apparatus determines that the distance measurement value is valid if a measured distance value is less influenced by multiple reflections or image noises and the measured distance between a reference point (e.g., an imaging unit or a projection unit) and a measuring target area is permissible. Further, the distance measuring apparatus determines that the distance measurement value is difficult to measure if acquiring an accurate distance value is difficult due to occlusion or saturation. Further, the distance measuring apparatus determines that the distance measurement value is invalid if a measured distance result is not accurate due to the influence caused by multiple reflections.

The distance measuring apparatus performs distance measuring processing for each pixel of the projection unit. Therefore, the distance measuring apparatus performs validity determination processing for each pixel. In the present exemplary embodiment, the distance measuring apparatus determines the validity of a distance measurement value of a measuring target object for each pixel of a display element provided in the projection unit. However, the present disclosure is not limited to the above-mentioned example. For example, the distance measuring apparatus can determine the validity of a distance measurement value of a measuring target object for a plurality of pixels of the display element provided in the projection unit. Further, the distance measuring apparatus can determine the validity of a distance measurement value of a measuring target object selectively for a single pixel or a plurality of pixels of the display element provided in the imaging unit.

Further, in the present exemplary embodiment, the distance measuring apparatus performs quenching or dimming processing for each pixel of the display element provided in the projection unit that corresponds to an area determined as being valid. However, the present disclosure is not limited to the above-mentioned example. For example, the distance measuring apparatus can perform quenching or dimming processing for a plurality of pixels of the display element provided in the projection unit.

The distance measuring apparatus according to the present exemplary embodiment has a configuration similar to the apparatus (see FIG. 1) described in the first exemplary embodiment. However, the determination unit 34 is functionally different from that described in the first exemplary embodiment. The function of the determination unit 34 is described in detail below.

The determination unit 34 can determine, for each area, whether the distance of the area calculated by the distance calculation unit 33 is accurate and reliable (i.e., valid). The determination method is described in detail below.

Further, the determination unit 34 determines, for each area, whether the measured area is an occlusion area based on an image of the measuring target object 4 captured by one of two imaging units. The occlusion area is a concealed area that cannot be recognized as a part of the measuring target object 4 by the other the other imaging unit.

Further, the determination unit 34 determines, for each area (e.g., each pixel or a plurality of pixels), whether the measured area is a saturation area based on an image of the measuring target object 4 captured by one of two imaging units. The saturation area is an area in which the luminance value of an image of the measuring target object 4 captured by the other imaging unit is saturated.

In the present exemplary embodiment, the occlusion area and the saturation area are collectively referred to as difficult-to-measure areas. However, the difficult-to-measure area can include any other area in which the measurement is difficult due to other reasons.

Further, in the present exemplary embodiment, the determination unit 34 acquires an occlusion area or a saturation area based on a captured image without actually calculating the distance. However, the determination unit 34 can acquire an occlusion area or a saturation area based on a calculation result obtained by the distance calculation unit 33.

The parameter storage unit 36 stores the determination result. The pattern to be projected can be updated based on the determination result.

The repetition control unit 35 performs control in such a way as to repeat the sequential processing until the termination condition is satisfied. The sequential processing includes projecting a projection pattern on the measuring target object and identifies each difficult-to-measure area based on a captured image and performing distance calculation processing based on the captured image. The sequential processing further includes determining whether each distance calculation result is valid and updating the projection pattern with reference to the difficult-to-measure area and the area determined as being valid. In the present exemplary embodiment, the repetition control unit 35 terminates the sequential processing when the number of repetitions reaches an arbitrary number of times designated by a user.

Figure 10A:
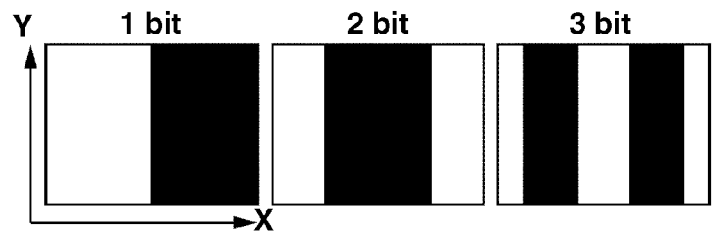
FIGS. 10A, 10B, 10C, and 10D illustrate a complementary pattern projection method according to a ninth exemplary embodiment together with an example occurrence of saturation.

The measurement pattern to be projected in the present exemplary embodiment is a code usable in the space coding method, as described below. FIGS. 10A, 10B, 10C, and 10D illustrate a complementary pattern projection method using the space coding method. First, the space coding method is described in detail below. The space coding method includes projecting a light pattern composed of a plurality of line beams on a measuring target object and identifying line numbers using a method for encoding the inside of a space in the time direction. The space coding method includes preliminarily calibrating a correspondence relationship between an emitting angle of the light pattern and an incident angle at an image sensor and performing distance measuring processing based on the principle of triangulation. It is feasible to identify line numbers of a plurality of line beams, for example, using a gray code method. FIG. 10A illustrates 1-bit, 2-bit, and 3-bit gray code patterns that are usable in the gray code method. Although not illustrated in FIG. 10A, 4-bit and higher-order gray code patterns are also usable.

The space coding method includes performing an image capturing operation while sequentially projecting the gray code patterns illustrated in FIG. 10A on a measuring target object. The space coding method further includes calculating a binary value in each bit based on a captured image. More specifically, the space coding method includes allocating binary value "1" to an area if the luminance of the captured image in each bit is equal to or greater than a threshold value. On the other hand, the space coding method includes allocating binary value "0" to an area if the luminance of the captured image is less than the threshold value. The space coding method further includes arranging binary values of respective bits in a row and designating an acquired numerical data as a gray code of the area. Finally, the space coding method includes converting the acquired gray code into a space code that can be used in the distance measuring processing.

Figure 10B:
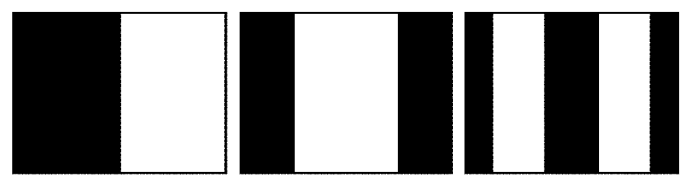

The complementary pattern projection method is, for example, usable as a threshold value determination method. When the gray code pattern illustrated in FIG. 10A is referred to as a positive pattern, an inverse pattern illustrated in FIG. 10B is referred to as a negative pattern. The method includes projecting the negative pattern illustrated in FIG. 10B on a measuring target object and performing an image capturing operation. The method further includes setting a luminance value of the negative pattern image as a threshold value.

It is now presumed that the measurement pattern to be projected is a pattern usable in the phase shift method, as described below. FIGS. 11A, 11B, and 11C illustrate details about the phase shift method. FIG. 11A illustrates timing of irradiation patterns. FIG. 11B illustrates luminance of an image captured at image-capturing timing. The phase shift method includes irradiating a measuring target object with a stripe light pattern having lightness changeable in a sine-wave shape. The phase shift method includes causing the imaging unit to capture an image of the stripe light pattern while shifting the phase thereof in increments of $\pi/2$. Accordingly, four images are obtainable when the total phase shift amount reaches $2\pi$. In FIG. 11B, four points $A_0$, $B_0$, $C_0$, and $D_0$ represent the luminance at the same position of four captured images. The following formula (6) expresses phase α of the pattern at the above-mentioned position.

$$\alpha = \tan^{-1} \frac{D_0 - B_0}{A_0 - C_0} \quad (6)$$

The phase α can be used in the distance measuring processing to be performed based on the principle of triangulation.

In the ninth exemplary embodiment, it is presumed that each of two cameras serves as an imaging unit. The apparatus performs distance measuring processing for each of the projection unit 1 and the imaging units 2A and 2B according to the above-mentioned triangulation-based distance measuring method. Further, it is feasible to measure the distance calculated using the imaging units 2A and 2B according to the triangulation-based distance measuring method. Therefore, the distance measuring apparatus can obtain three distance measurement results, i.e., the distance calculated using the projection unit 1 and the imaging unit 2A, the distance calculated using the projection unit 1 and the imaging unit 2B, and the distance calculated using the imaging unit 2A and the imaging unit 2B. However, the pixel correspondence between two imaging units can be acquired, for example, with reference to the correspondence relative to the projection unit. However, the correspondence acquisition method is not limited to the above-mentioned example. An appropriate twin-stereo matching method (e.g., a method discussed in the following literature) is usable to acquire the relationship between two imaging units 2A and 2B.

D. Scharstein and R. Szeliski, "A taxonomy and evaluation of dense two-frame stereo correspondence algorithms," IJCV, vol. 47, no. 1, 2002

Next, an example method for detecting the position of a display element provided in a projection unit that corresponds to an area in which a measuring target object is hidden from an imaging unit is described below. To simplify the description, it is presumed that the measurement pattern to be projected is a code, for example, employable in the space coding method. In a case where a measuring target object is not hidden from an imaging unit, a code is uniquely allocated to the measuring target object when a projection unit projects a measurement pattern group and an imaging unit captures an image of the measuring target object. In a case where a measuring target object is hidden from an imaging unit, the imaging unit cannot capture an image of the hidden target object when a pattern group is projected from a projection unit. Therefore, a captured image includes a portion where the code is discontinuous. The discontinuous code portion indicates the presence of the display element provided in the projection unit that corresponds to the area where the measuring target object is hidden from the imaging unit.

In the present exemplary embodiment, the distance measuring apparatus quenches or dims a projection pattern portion that corresponds to an area determined as being valid (i.e., an area not influenced by multiple reflections) and an area determined as being an occlusion area. Further, the distance measuring apparatus repetitively performs sequential processing including projection, imaging, distance measurement, and determination based on an updated pattern. Thus, the distance measuring apparatus according to the present exemplary embodiment can enlarge the area in which the measurement is feasible while suppressing the generation of multiple reflections.

Processing to be performed in response to a validity determination by the determination unit 34 is already described in the above-mentioned exemplary embodiment. Therefore, redundant description thereof will be avoided.

Figure 12:
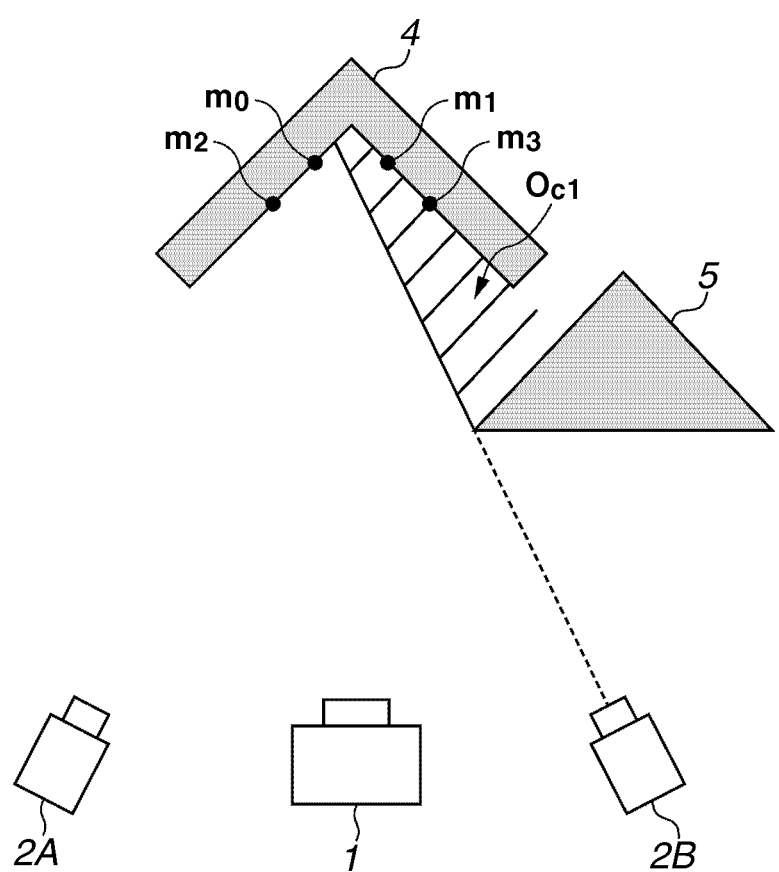
FIG. 12 illustrates an example occlusion of a measuring target object described in the ninth exemplary embodiment.

For example, the determination unit 34 identifies a difficult-to-measure area as illustrated in FIG. 12. When the projection unit 1 and the imaging units 2A and 2B are placed at positions illustrated in FIG. 12 to measure the measuring target object 4, a shielding member 5 forms an occlusion area $O_{c1}$ in which a part of the measuring target object 4 is concealed from the imaging unit 2B. When the pattern from the projection unit 1 reaches a measurement point $m_1$ of the occlusion area $O_{c1}$, the imaging unit 2A can capture an image of the pattern and the imaging unit 2B cannot capture any image of the pattern. Therefore, the determination unit 34 determines that the measurement point $m_1$ is included in an occlusion area because only the projection unit 1 and the imaging unit 2A are usable to perform distance measuring processing based on triangulation. Then, the distance measuring apparatus quenches or dims the pattern to be projected on an area including the measurement point $m_1$. The determination unit 34 performs the above-mentioned determination processing by for the entire measurement area. The distance measuring apparatus quenches or dims each pattern to be projected on the occlusion area $O_{c1}$.

Further, the determination unit 34 determines an area as being invalid if there is a discordance between distance measurement results due to influence caused by multiple reflections. In the present exemplary embodiment, the above-mentioned occlusion area is not included in the invalid area. The distance measuring apparatus does not perform quenching or dimming processing for each area determined as being invalid.

Figure 13A:
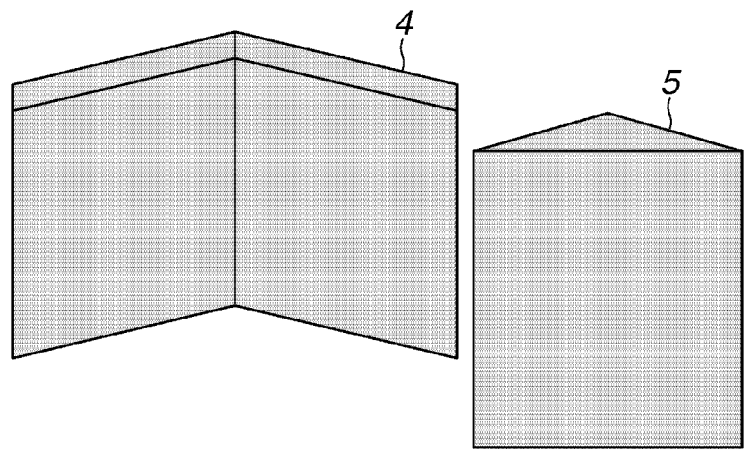
FIGS. 13A, 13B, and 13C illustrate an example of occlusion containing pattern updating processing according to the ninth exemplary embodiment.
Figure 13B:
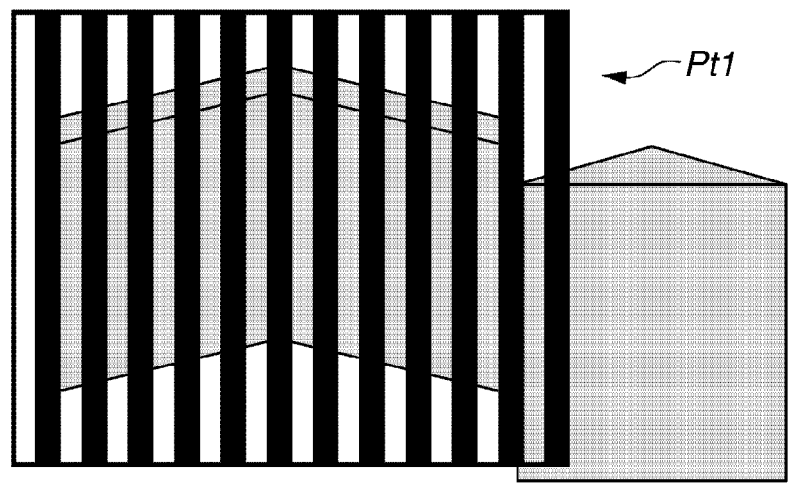
Figure 13C:
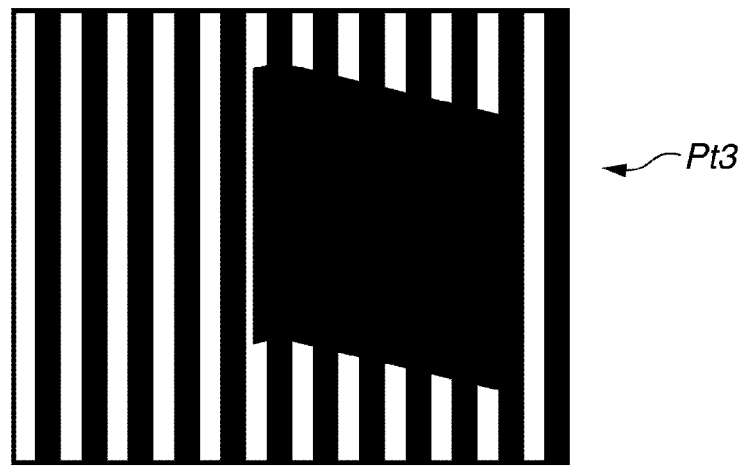

Projection pattern updating processing is described in detail below with reference to FIGS. 13A, 13B, and 13C. FIG. 13A illustrates the measuring target object 4 and the shielding member 5 that can be observed from the projection unit 1. Although the measuring target object 4 can be entirely observed from the projection unit 1, as illustrated in FIG. 12, an approximately half of the measuring target object 4 is concealed by the shielding member 5 if observed from the imaging unit 2B placed on the right side of the projection unit 1. FIG. 13B illustrates the ordinary light pattern Pt1 projected on the measuring target object 4. The determination unit identifies an area of the light pattern Pt1, if it cannot be captured by the imaging unit 2B, as a difficult-to-measure area. FIG. 13C illustrates the updated light pattern Pt3 obtained through quenching or dimming processing. As understood from the foregoing descriptions, it is feasible to quench or dim an area that cannot be quenched or dimmed because it cannot be determined as being valid by the determination unit even after the projection pattern is updated and the distance measuring processing is repetitively performed.

Figure 14A:
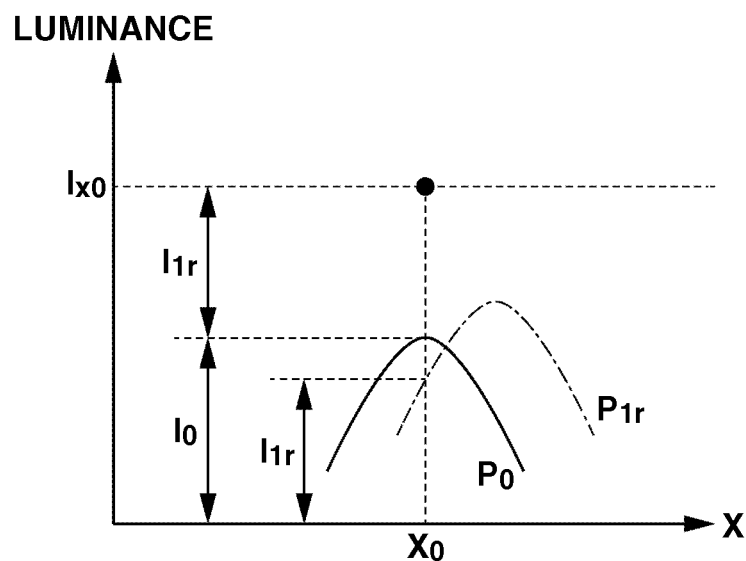
FIGS. 14A and 14B illustrate example luminance values at pixel positions influenced by multiple reflections described in the ninth exemplary embodiment.

Next, it is presumed that a multiple reflection occurs at the measurement point $m_1$ illustrated in FIG. 12, as described below. In FIG. 12, it is presumed that the pattern from the projection unit 1 causes a multiple reflection at the measurement point $m_1$ and casts a glare at a measurement point $m_0$. FIG. 14A illustrates the luminance of a captured image that includes the influence of the multiple reflection occurring at the measurement point $m_1$ illustrated in FIG. 12. The projection unit 1 projects a pattern $P_0$ on an area including the measurement point $m_0$.

Further, if the light pattern causes a multiple reflection when it is projected from the projection unit 1 on an area including the measurement point $m_1$, a pattern $P_1$, casts a glare at the measurement point $m_0$.

Accordingly, the luminance value at a pixel $x_0$ of a captured image that corresponds to the position of the measurement point $m_0$ is equal to a sum $I_{x0}$ of a luminance component $I_0$ of the pattern $P_0$ projected on an area including the measurement point $m_0$ and a luminance component $I_1$, of the pattern $P_1$, caused by the multiple reflections of the light pattern projected on an area including the measurement point $m_1$.

As mentioned above, when a light pattern from the projection unit 1 is imaged, the luminance value of an image changes greatly. Therefore, the projection unit 1 and the imaging unit 2A may erroneously perform distance measuring processing about the measurement point $m_0$. Thus, even when the projection unit 1 and the imaging unit 2B can accurately perform distance measuring processing about the measurement point $m_0$, the determination unit cannot make a determination about validity because of the discordance between distance measurement values.

On the other hand, the projection unit 1 and the imaging unit 2B cannot perform distance measuring processing about the measurement point $m_1$, although the projection unit 1 and the imaging unit 2A can perform distance measuring processing about the measurement point $m_1$. Therefore, the determination unit does not make a determination about validity. Further, the number of distance measurement values obtainable by repetitively performing the projection pattern updating processing for the measurement point $m_1$ is limited to only one. Therefore, the determination unit does not make a determination about validity.

Figure 14B:
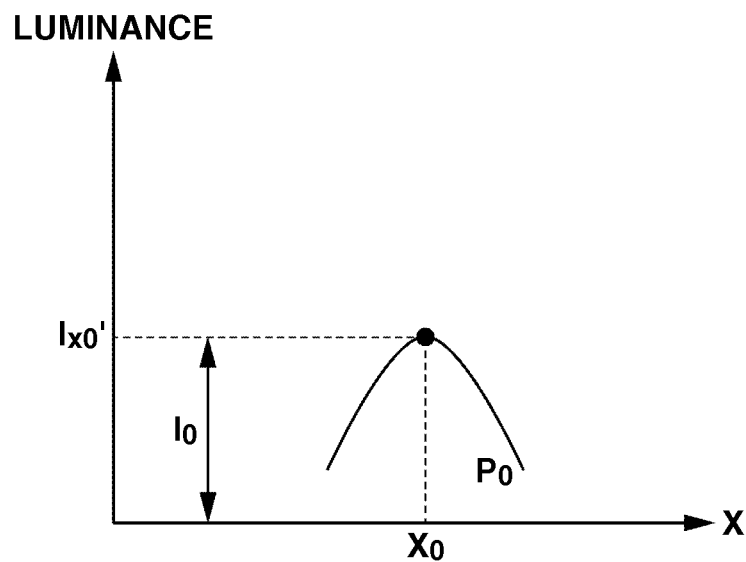

Therefore, when the determination unit 34 determines that the measurement point $m_1$ is included in a difficult-to-measure area, the distance measuring apparatus quenches or dims the light pattern to be projected to the measurement point $m_1$ in the occlusion area $O_{c1}$. Thus, no multiple reflections occur at the measurement point $m_1$. Accordingly, as illustrated in FIG. 14B, the luminance value of a captured image at a pixel $x_0$ that corresponds to the position of the measurement point $m_0$ is equal to a luminance value $I_{x0}'$ (i.e., the luminance component $I_0$ of the pattern $P_0$ projected on the area including the measurement point $m_0$). Therefore, the distance measuring apparatus can perform distance measuring processing for the measurement point $m_0$ without causing any error.

Example processing according to the ninth exemplary embodiment, including measurement of a multiple reflection area, is described below with reference to a flowchart illustrated in FIG. 15.

In step S1501, the projection unit 1 projects a measurement pattern group on the measuring target object 4 and each of the imaging units 2A and 2B captures an image of the measuring target object 4. If the image-capturing operation by each imaging unit is completed, the projection unit 1 projects the next measurement pattern and each of the imaging units 2A and 2B captures an image of the measuring target object 4. The projection unit 1 and the imaging units 2A and 2B repeat the above-mentioned processing until the above-mentioned projection and imaging processing is completed for all of the measurement patterns included in the group. The measurement pattern is, for example, a gray code, although the measurement pattern is not limited to a specific code. The captured data is transmitted to the image acquisition unit 32.

In step S1502, the distance measuring apparatus detects an occlusion area (i.e., a concealed area) in which a part of the measuring target object 4 is hidden when it is observed from the imaging unit 2A or 2B, although the pattern from the projection unit 1 is projected on the measuring target object 4. More specifically, it is feasible to detect the occlusion area because the correspondence between the display element of the projection unit 1 and each image sensor of the imaging units 2A and 2B can be known through the measurement pattern projection and imaging processing performed in step S1501. For example, in a case where a distance measurement pattern is a code applicable to the space coding method, the measuring space can be uniquely coded and a pattern that cannot be captured by the imaging unit is detectable.

In step S1503, the distance calculation unit 33 calculates three distance measurement results, i.e., the distance calculated using the projection unit 1 and the imaging unit 2A, the distance calculated using the projection unit 1 and the imaging unit 2B, and the distance calculated using the imaging unit 2A and the imaging unit 2B, based on the captured image, using the above-mentioned triangulation method, for each area.

In step S1504, the determination unit 34 determines whether the distance measurement result in each area is valid, occlusion area, or invalid based on the above-mentioned three distance measurement results. If it is determined that there is a coincidence between respective distance measurement values in each area, it can be determined that the distance measurement result is not influenced by multiple reflections and can be regarded that the obtained measurement result is valid. Multiple reflections, if occur on a measuring target object having higher glossiness, have an influence variable depending on the direction of each viewpoint selected in the observation. Therefore, if the measuring target object is observed by a different imaging unit (from a different viewpoint), the presence of any adverse influence if caused by multiple reflections can be recognized.

In the present exemplary embodiment, the processing to be performed in step S1502 includes checking the correspondence between the display element and each image sensor without measuring the distance, acquiring a lower luminance area, and identifying the acquired area as an occlusion area. Alternatively, the processing to be performed in step S1504 can include acquiring an occlusion area based on a distance measurement result. More specifically, an area can be identified as an occlusion area if the number of distance measurement results obtained by the imaging units is limited to only one due to the presence of a shielding object.

Further, in a case where there is not any coincidence between three distance measurement values due to an influence other than multiple reflections, such as randomly generated image noises, it can be regarded that the distance measurement result is undeterminable.

However, even in a state where there is not any influence caused by multiple reflections and image noises, distance measurement values obtained by a plurality of distance measurement systems may not have any perfect coincidence. If the actual state differs from an ideal state (i.e., a simulation), internal/external parameters obtained beforehand by calibration for the projection unit and the imaging unit may include tiny errors. The internal/external parameters for the projection unit and the imaging unit are used in calculating distance values. Therefore, errors if contained in the internal/external parameters appear as errors in obtained distance measurement values.

In general, it is difficult to remove or correct a calibration error unless the calibration is newly performed. Therefore, in a case where a calibration error causes a discordance between distance measurement values obtained by a plurality of distance measurement systems, it is useful to designate the position and orientation of a specific projection unit and a specific imaging unit (e.g., the projection unit 1 and the imaging unit 2A) as calibration standards and set a permissible range. Although the above-mentioned standards may differ from true values, removing or correcting the calibration error is difficult. Therefore, the above-mentioned method for determining coincidence/discordance between distance measurement values is considered appropriate.

More specifically, the method includes performing projection again for calibration data using the obtained internal/external parameters, calculating an error in a distance measurement result obtained by the calibration, and determining a permissible range from the standards (i.e., the range in which the distance measurement values can be regarded as being coincident with each other) based on the calculated error. Further, in this case, the distance cannot be fixed to only one measurement value. Therefore, it is useful to designate values in a reference system as representative values. However, the method is not limited to the above-mentioned example. Another method using a mean value or a median as a representative value is employable.

In step S1505, the repetition control unit 35 updates the projection pattern group in such a way as to quench or dim a partial area of the projection pattern that corresponds to an area regarded as being valid with respect to the distance measurement value, based on the determination result obtained in step S1504. The area regarded as being valid with respect to the distance measurement value is an area in which a desired distance measurement value can be obtained. In other words, repetitively performing the distance measuring processing for the above-mentioned area is unnecessary. The distance measuring apparatus quenches or dims the light pattern that is projected on the above-mentioned area. In a case where the light pattern reflected at the above-mentioned area causes multiple reflections (namely, illuminates another surface of the measuring target object), removing adverse influence that may be caused by multiple reflections is feasible by projecting an updated projection pattern in the next repetitive processing.

In step S1506, the distance measuring apparatus updates the projection pattern group in such a way as to quench or dim a light pattern portion that corresponds to the occlusion area, in which the measuring target object is hidden when it is observed from the imaging unit 2A or 2B in a state where the projection pattern from the projection unit 1 is projected on the measuring target object, based on the determination result obtained in step S1504.

The determination unit 34 cannot determine the occlusion area as being valid because a plurality of distance measurement values cannot be obtained about the occlusion area. Therefore, the occlusion area remains without being excluded through the quenching or dimming processing even when the distance measuring processing is repetitively performed.

However, in a case where multiple reflections occur when the light reflected at the concealed area illuminates another surface of the measuring target object, it is feasible to remove adverse influence to be caused by the multiple reflections because a light pattern portion that illuminates the occlusion area is quenched or dimmed and an updated projection pattern can be projected in the next repetitive processing.

However, the projection pattern updating method employable in step S1505 or step S1506 is not limited to the above-mentioned quenching or dimming processing. Any other method for reducing the influence of light that illuminates the area regarded as being valid is employable. For example, it is useful to brighten a projection pattern portion that corresponds to an area determined as being undeterminable with respect to the distance measurement value.

If the processing in steps S1501 to S1506 has been thoroughly completed once, then in step S1507, the repetition control unit 35 determines whether the termination condition is satisfied. If it is determined that the termination condition is satisfied (YES in step S1507), the operation proceeds to step S1508.

If it is determined that the termination condition is not satisfied (NO in step S1507), the operation returns to step S1501 in which the projection unit 1 and the imaging units 2A and 2B repeat the above-mentioned processing using the projection pattern updated in step S1505 at least once. In the ninth exemplary embodiment, it is presumed that the termination determination condition is "repeating the processing N times (i.e., an arbitrarily designated number of times)." Accordingly, if it is determined that the number of repetitions is equal to or less than N−1, the operation returns to step S1501. If it is determined that the number of repetitions is equal to N, the operation proceeds to step S1508.

Performing the repetitive processing a plurality of times is effective to remove the influence of three or more reflections or reduce the influence of image noises. Further, the number of repetitions can be arbitrarily designated. Thus, the distance measuring apparatus can perform processing according to actual takt time.

The termination determination condition is not limited to "repeating the processing a predetermined number of times." For example, it is feasible to determine the termination timing based on time used to complete the sequential processing in steps S1501 to S1506. Further, it is feasible to determine the termination timing based on a result obtained through the processing in steps S1505 and S1506. Further, it is feasible to determine the termination timing based on a past measurement result and a present measurement result.

When the operation returns to step S1501, the distance measuring apparatus repeats the above-mentioned sequential processing (see steps S1501 to S1506) including projecting the projection pattern group updated in step S1505 and capturing an image of the updated pattern group, then in step S1507, the distance measuring apparatus determines whether the termination condition is satisfied. The distance measuring apparatus repeats the above-mentioned processing until the termination condition is satisfied.

In step S1508, the distance measuring apparatus integrates distance measurement results. While performing the repetitive processing, the distance measuring apparatus stores a distance measurement value obtained in an area if the area is newly regarded as being valid with respect to the distance measurement value. If the area is once regarded as being valid, the distance measuring apparatus stores the obtained distance measurement value while associating it with the area and no longer designates the area as a target to be subjected to the repetitive processing.

Accordingly, if an area is newly regarded as being valid with respect to the distance measurement value in the i-th repetitive processing, the distance measuring apparatus stores a distance measurement value obtained in this area. Then, in step S1508, the distance measuring apparatus obtains a distance measurement result with respect to the measuring target object by integrating N pieces of distance measurement result data. However, the present disclosure is not limited to the above-mentioned example. For example, it is useful that the distance measuring apparatus adds a distance measurement value, if it is detected in an area newly determined as being valid with respect to the distance measurement value, to the distance measurement result data at appropriate timing (e.g., at the processing timing in step S1507) during the repetitive processing. In this case, the distance measurement result is already integrated at the time when the operation proceeds to step S1508.

Figure 15:
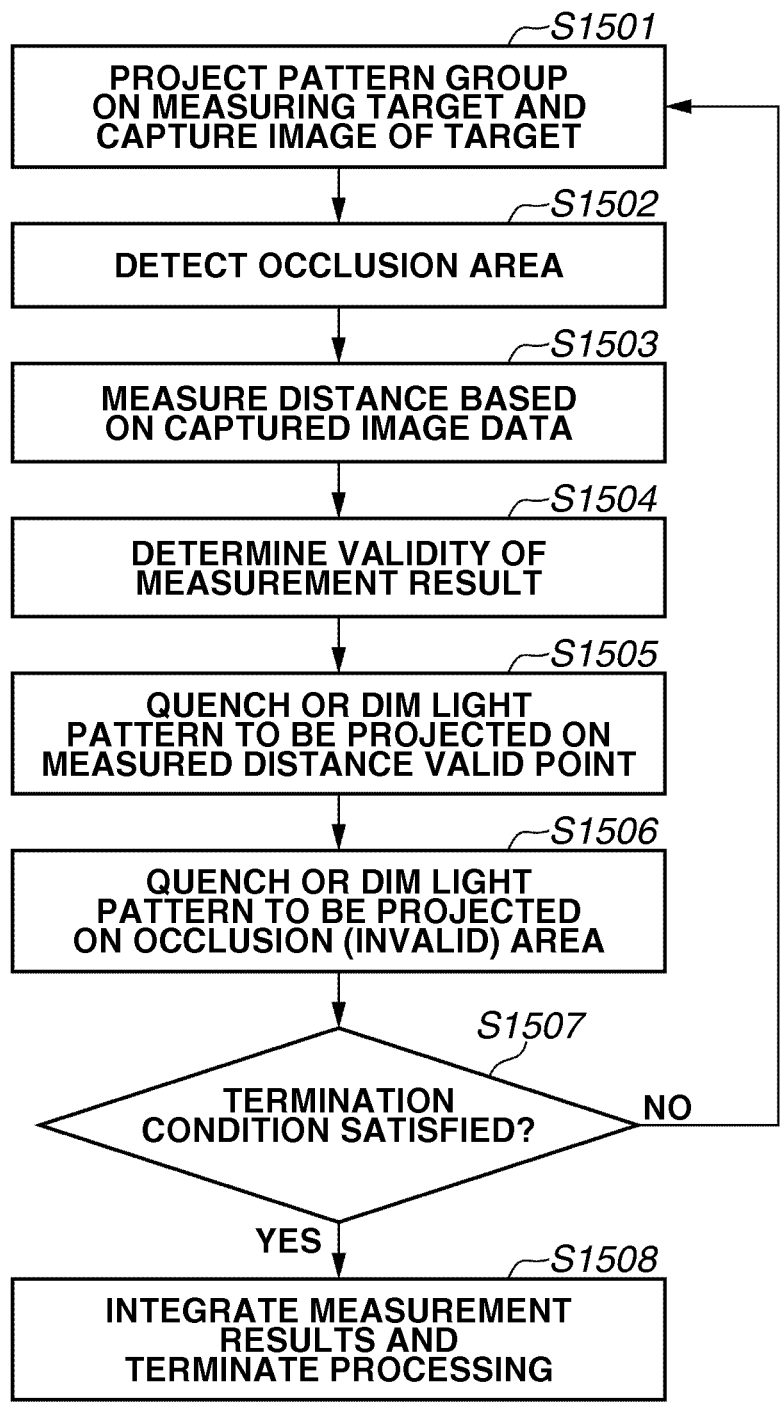
FIG. 15 is a flowchart illustrating occlusion influence elimination processing that can be performed by the distance measuring apparatus according to the ninth exemplary embodiment.

As mentioned above, the distance measuring apparatus completes the processing of the flowchart illustrated in FIG. 15.

As mentioned above, the distance measuring apparatus quenches or dims a projection pattern portion determined as being valid with respect to the distance measurement value and a projection pattern portion that corresponds to an occlusion area. In other words, the distance measuring apparatus increases the valid distance value measurable area through repetitive processing while suppressing adverse influence to be caused by multiple reflections.

Next, as another exemplary embodiment, it is feasible to designate a saturation area as a difficult-to-measure area and reduce the luminance of a light pattern to be projected to the saturation area, as described below.

For example, in a case where a distance measurement pattern is a code applicable to the space coding method, the degree of ambiguity about the position is equivalent to the width of a least significant bit. However, the distance measurement accuracy can be increased by detecting a boundary position where the binary value is switched from "0" to "1" or from "1" to "0" in a captured image because the ambiguity becomes smaller than the bit width.

Figure 10C:
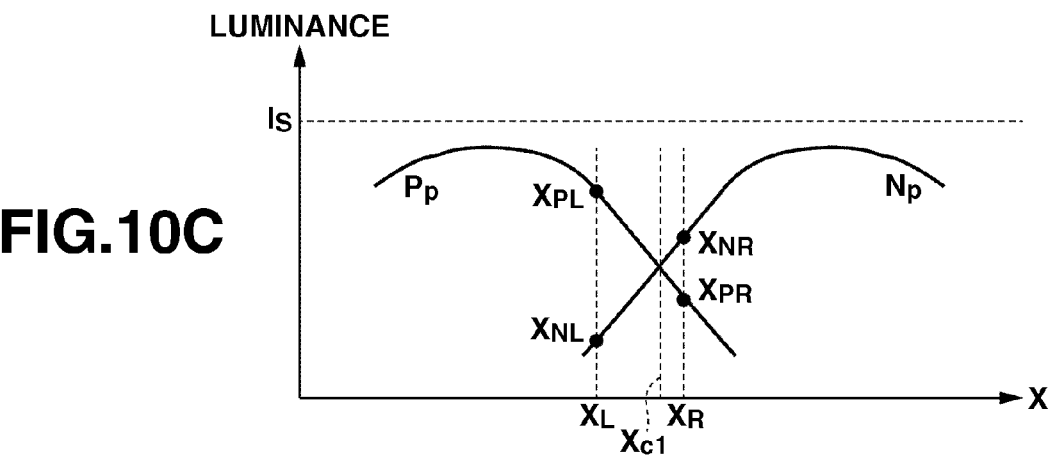

FIG. 10C illustrates example variations in the luminance at a boundary position where the binary value is switched. In an ideal state, the luminance value rises or falls impulsively. However, due to the blur of a light pattern or the influence of an imaging object (i.e., the measuring target object), the luminance value changes moderately along a straight line or a curve. In FIG. 10C, a positive pattern $P_P$ and a negative pattern $N_P$ intersect each other in a region between an x-coordinate $X_L$ and an x-coordinate $X_R$. In FIG. 10C, $X_{PL}$ represents a luminance value of the positive pattern Pp at the pixel $X_L$, and $X_{PR}$ represents a luminance value of the positive pattern $P_P$ at the pixel $X_R$. Further, $X_{NL}$ represents a luminance value of the negative pattern $N_P$ at the pixel $X_L$, and $X_{NR}$ represents a luminance value of the negative pattern $N_P$ at the pixel $X_R$. Further, $I_s$ represents a saturation level of the luminance value, and $X_{c1}$ represents a position where the positive pattern $P_P$ and the negative pattern $N_P$ intersect each other. In this case, accurately obtaining the position $X_{c1}$ where the binary value is switched is important.

Figure 10D:
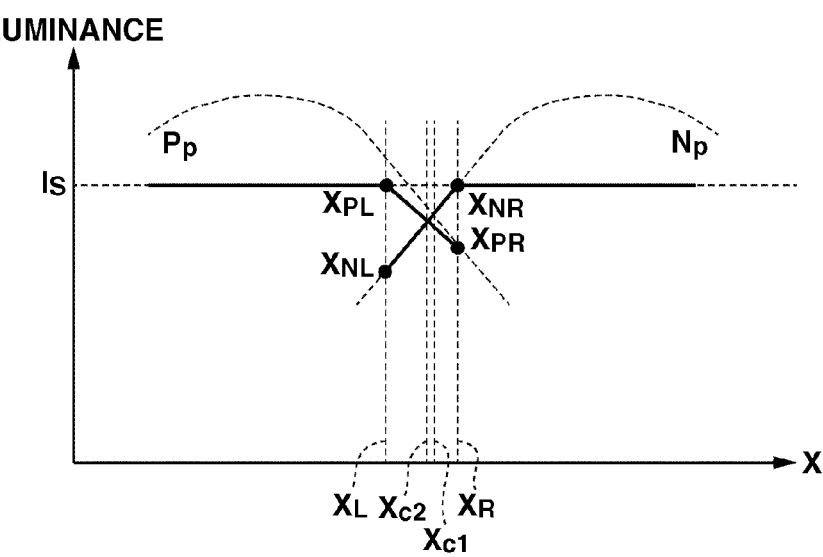

FIG. 10D illustrates a state where each of the positive pattern $P_P$ and the negative pattern $N_P$ partially exceeds the saturation level $I_s$. More specifically, the luminance value $X_{PL}$ of the positive pattern $P_P$ is equal to the saturation level $I_s$ at the pixel $X_L$. The luminance value $X_{PR}$ of the positive pattern $P_P$ does not exceed the saturation level $I_s$ at the pixel $X_R$. The luminance value $X_{NL}$ of the negative pattern $N_P$ does not exceed the saturation level $I_s$ at the pixel $X_L$. The luminance value $X_{NR}$ of the negative pattern $N_P$ does not exceed the saturation level $I_s$ at the pixel $X_R$. The luminance of the positive pattern $P_P$ changes along a solid line (not a dotted line). Similarly, the luminance of the negative pattern $N_P$ changes along a solid line (not a dotted line). The positive pattern $P_P$ and the negative pattern $N_P$ intersect each other at a position $x_{c2}$. More specifically, if the luminance value $X_{PL}$ of the positive pattern $P_P$ reaches the saturation level $I_s$ at the pixel $X_L$, the boundary position (i.e., the binary value switching position) changes from $X_{c1}$ to $X_{c2}$. Thus, an error occurs in detecting a sign value. As a result, a distance measurement value, if calculated based on these data, is inaccurate.

Further, as another example, if the distance measurement pattern is a pattern applicable to the phase shift method, when the pattern shifts from a dotted line to a solid line as illustrated in FIG. 11C, the pattern partially reaches the saturation level $I_s$ at regions $A_1$ and $C_1$. Therefore, an error occurs in calculating the phase. Then, as a result, a distance measurement result, if calculated based on these data, is inaccurate.

Even if the distance of an area can be accurately measured by a pair of the projection unit and one imaging unit, the determination unit cannot determine the area as being valid if another pair of the projection unit and the other imaging unit cannot accurately measure the distance due to saturation in the luminance value. Therefore, the area remains without being excluded through the quenching or dimming processing even when the distance measuring processing is repetitively performed.

However, it is feasible to remove adverse influence to be caused by multiple reflections by quenching or dimming the light that illuminates the above-mentioned area.

In the present exemplary embodiment, the projection unit 1 projects a light pattern on a measuring target object and each of the imaging units 2A and 2B captures an image of the measuring target object.

The determination unit determines a luminance value saturated area in a captured image as a saturation area.

Then, the distance measuring apparatus quenches or dims a pixel of a light pattern area that corresponds to the luminance saturation area. The distance measuring apparatus according to the present exemplary embodiment has a configuration similar to that illustrated in FIG. 1. Therefore, redundant description thereof will be avoided.

Figure 16:
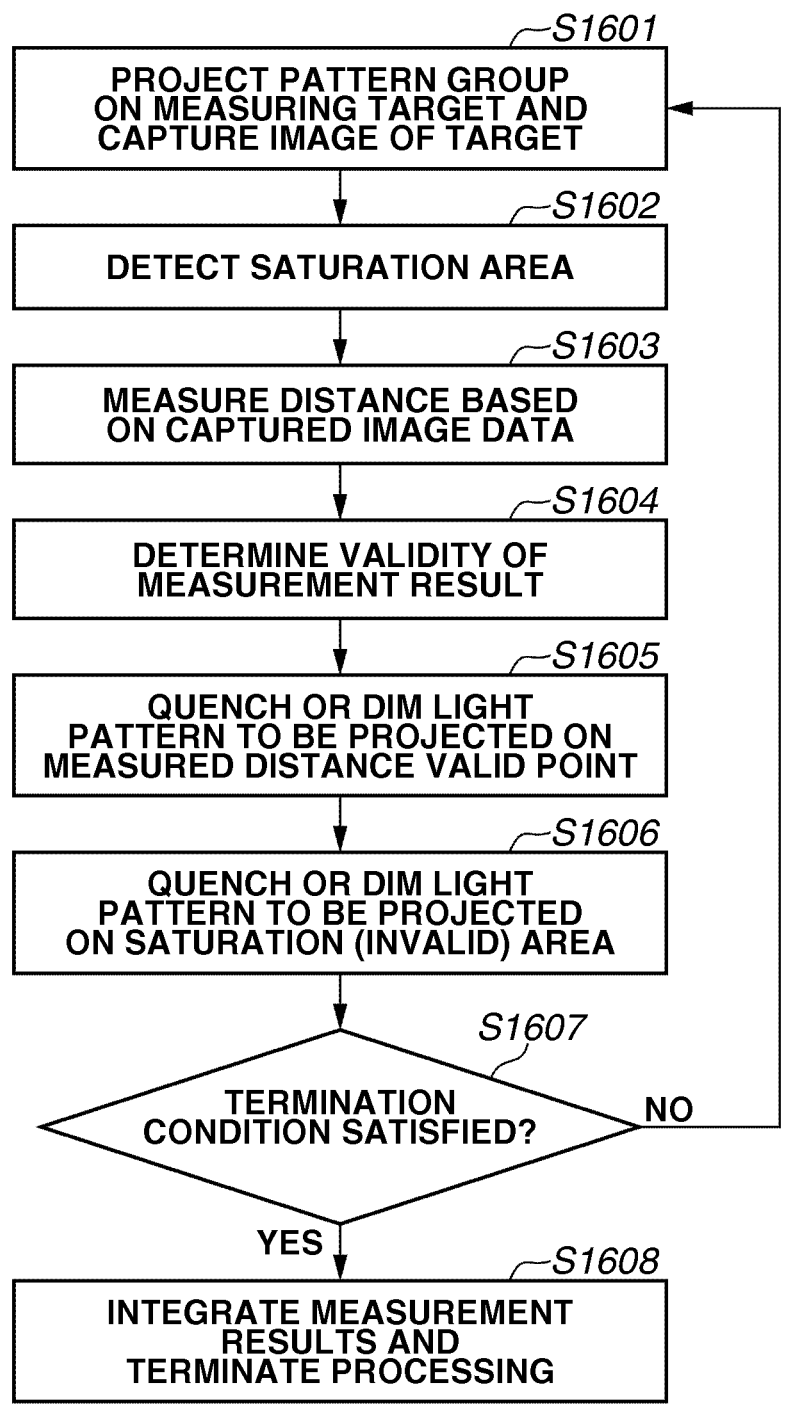
FIG. 16 is a flowchart illustrating saturation influence elimination processing that can be performed by the distance measuring apparatus according to the ninth exemplary embodiment.

A flowchart according to the present exemplary embodiment is substantially similar to that illustrated in FIG. 15. Therefore, redundant description thereof will be avoided if processing content is similar to that already described. Processing to be performed in step S1602 and step S1606 (i.e., steps each containing different processing content) is described in detail below with reference to a flowchart illustrated in FIG. 16.

In step S1602, the distance measuring apparatus detects a saturation area included in the image captured in step S1601. The saturation area detection is feasible by checking whether a pixel of the captured image reaches an upper-limit value of the gradation that can be expressed by the pixel. For example, if the captured image is an 8-bit image, the number of expressible gradations is "256". Therefore, if the luminance value of an area reaches "256", the area can be regarded as being a saturation area.

In step S1606, the distance measuring apparatus updates the projection pattern group in such a way as to quench or dim a projection pattern portion that corresponds to the saturation portion of the captured image detected in step S1602.

As mentioned above, the distance measuring apparatus quenches or dims a projection pattern portion determined as being valid with respect to the distance measurement value and a projection pattern portion that corresponds to a saturation area. In other words, the distance measuring apparatus increases the valid distance value measurable area through repetitive processing while suppressing adverse influence to be caused by multiple reflections.

In the ninth exemplary embodiment, the determination of an area in which an occlusion occurs and the determination of an area in which a saturation occurs are independently performed. Alternatively, an occlusion area and a saturation area can be simultaneously determined.

Further, in the ninth exemplary embodiment, the distance measuring apparatus uses two imaging units. However, the present disclosure is not limited to the above-mentioned example. It is useful to provide an arbitrary number of (three or more) imaging units. In this case, three or more distance measurement results are obtainable. However, it is unnecessary to calculate distance measurement results for all combinations of the projection unit and the imaging unit. It is useful to perform distance measuring processing only for a limited number of (a total of M) combinations according to the triangulation method. Further, in the determination processing in step S1504 or step S1604, it is not necessary to confirm complete coincidence among all of M pieces of distance measurement data. If a predetermined number of (or a predetermined ratio of) distance measurement values are coincident with each other, it can be regarded that all of the distance measurement values are valid. Further, in the determination processing to be performed in step S1504 or step S1604, if the occlusion or the saturation occurs in a plurality of imaging units, a distance measurement result if obtained by a pair of a single projection unit and a single imaging unit can be regarded as an invalid distance measurement value.

A distance measuring apparatus according to a tenth exemplary embodiment includes two projection units and a single imaging unit that cooperatively perform three-dimensional measuring processing and determine whether the distance of a measured area is valid (or invalid) or undeterminable.

The distance measuring apparatus according to the tenth exemplary embodiment has a configuration similar to the configuration (see FIG. 7) described in the second exemplary embodiment. Therefore, redundant description thereof will be avoided. The distance measuring apparatus according to the tenth exemplary embodiment is substantially similar to the apparatus (see FIG. 1) described in the ninth exemplary embodiment, although two projection units (i.e., projection units 1A and 1B) and only one imaging unit (i.e., imaging unit 2) are provided in the present exemplary embodiment. A flowchart according to the tenth exemplary embodiment is substantially similar to the flowchart (see FIG. 15) described in the ninth exemplary embodiment. Therefore, redundant description for similar processing will be avoided and processing to be performed in step S1501 and step S1502 will be described below.

In step S1501 according to the tenth exemplary embodiment, each of the projection units 1A and 1B projects a measurement pattern group on the measuring target object 4, and the imaging unit 2 captures an image of the measuring target object 4. In this case, to prevent the imaging unit 2 from confusing a pattern projected by the projection unit 1B from a pattern projected by the projection unit 1A, the projection units 1A and 1B sequentially project the measurement patterns and the imaging unit 2 successively captures images of the projected patterns. However, the method for eliminating any confusion is not limited to the above-mentioned example. It is useful to use multiplexing of the light source. For example, as an example multiplexing of the light source, it is useful to use different colors for respective light patterns to be emitted from the projection units 1A and 1B.

Then, the apparatus performs distance measuring processing for each of the projection units 1A and 1B and the imaging unit 2 according to the above-mentioned triangulation-based distance measuring method. Further, it is feasible to perform distance measuring processing for the projection units 1A and 1B based on the triangulation method by taking a correspondence relationship between pixel coordinate values of two projection units into consideration, instead of using pixel coordinate values corresponding to the imaging unit. Therefore, the distance measuring apparatus can obtain three distance measurement results, i.e., the distance calculated using the projection unit 1A and the imaging unit 2, the distance calculated using the projection unit 1B and the imaging unit 2, and the distance calculated using the projection unit 1A and the projection unit 1B. However, the pixel correspondence between two projection units can be acquired by referring to the correspondence between the projection unit and the imaging unit.

Figure 17:
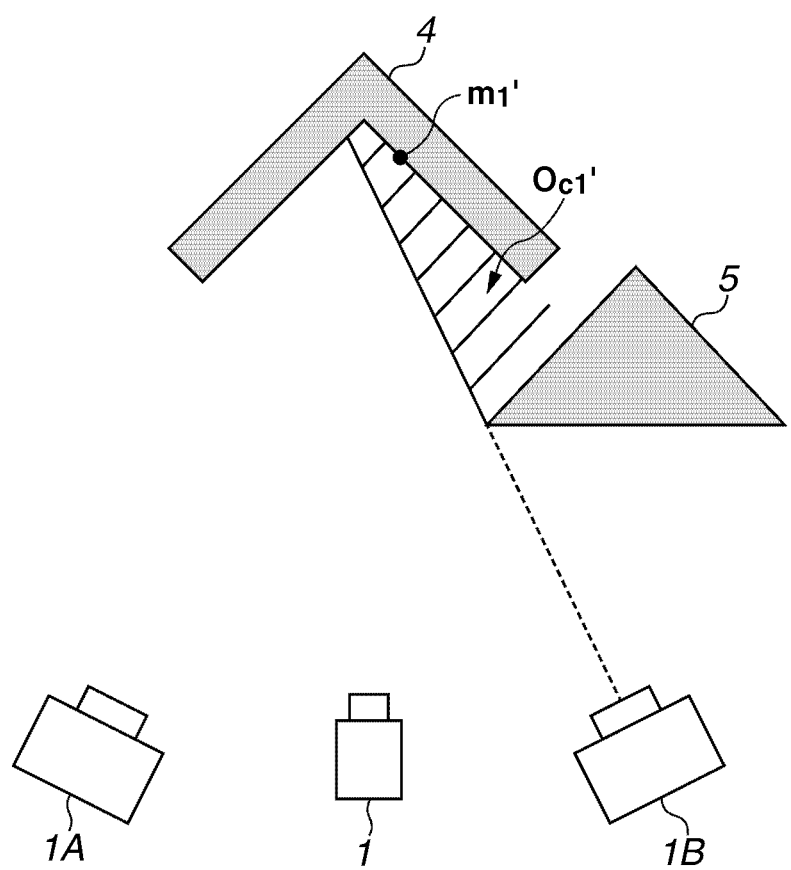
FIG. 17 illustrates an example occlusion of a measuring target object described in a tenth exemplary embodiment.

In the tenth exemplary embodiment, in step S1502, the distance measuring apparatus detects an area in which a projection pattern is not projected even when the projection unit projects the projection pattern on a measuring target object and the imaging unit captures an image of the measuring target object. The processing to be performed in step S1502 is described below with reference to FIG. 17. First, the distance measuring apparatus activates the projection unit 1B and causes the imaging unit 2 to capture an image of the measuring target object. Next, the distance measuring apparatus deactivates the projection unit 1B and causes the imaging unit 2 to capture an image of the measuring target object. When two images are compared, there is not any change in the luminance value at a measurement point $m_1'$ of a projection unfeasible area $O_{c1}'$ where the light from the projection unit 1B is shielded by the shielding member 5. The luminance value in the quenched state is equal to the luminance value in the fully lighted state. Thus, the distance measuring apparatus can identify an occlusion area by detecting such an area. However, the method for detecting an occlusion area is not limited to the above-mentioned example. Any other method is employable.

The configuration described in the tenth exemplary embodiment uses two projection units. However, the present disclosure is not limited to the above-mentioned example. As described in the ninth exemplary embodiment, it is useful to provide an arbitrary number of projection units.

The distance measuring apparatus according to the tenth exemplary embodiment of the present disclosure has a characteristic configuration as mentioned above.

A distance measuring apparatus according to an eleventh exemplary embodiment performs a first pattern updating operation in such a way as to cause the projection unit to project a pattern on a measuring target object and cause the imaging unit to quench or dim a pattern portion corresponding to an area where the measuring target object is hidden. Then, the distance measuring apparatus performs a second pattern updating operation in such a way as to stop quenching or dimming the pattern portion and start lightening or brightening the pattern. More specifically, in the eleventh exemplary embodiment, the distance measuring apparatus temporarily quenches or dims a light pattern portion that corresponds to a difficult-to-measure area (e.g., an occlusion area or a saturation area). The distance measuring apparatus has a configuration similar to the apparatus (see FIG. 1)

described in the ninth exemplary embodiment. Therefore, redundant description thereof will be avoided.

As mentioned in the ninth exemplary embodiment, an occlusion area remains without being determined as a valid area by the determination unit because a measuring target object cannot be observed by the imaging unit although the projection unit projects a pattern on the measuring target object. The present exemplary embodiment is applicable in a case where such an occlusion area is influenced by multiple reflections caused by other area. First, in the first pattern updating operation, the distance measuring apparatus performs quenching or dimming processing in such a way as to suppress generation of multiple reflections from the occlusion area to enlarge the distance measurable area. Next, in the second pattern updating operation, the distance measuring apparatus stops the quenching or dimming processing and starts pattern lightening or brightening processing for the occlusion area subjected to the quenching or dimming processing in the first pattern updating operation. Although the determination unit cannot determine the occlusion area as being valid, it is feasible to confirm that the distance measurement has been accurately performed if the luminance value of an image captured by the other imaging unit is reduced after the pattern updating processing is repetitively performed in a state where the occlusion area cannot be observed by one imaging unit.

An example case where multiple reflections occur at a measurement point $m_2$ and a measurement point $m_3$ in FIG. 12 is described below. In FIG. 12, it is presumed that a pattern projected from the projection unit 1 causes a multiple reflection in an area including the measurement point $m_2$ and casts a glare in an area including the measurement point $m_3$.

Figure 18A:
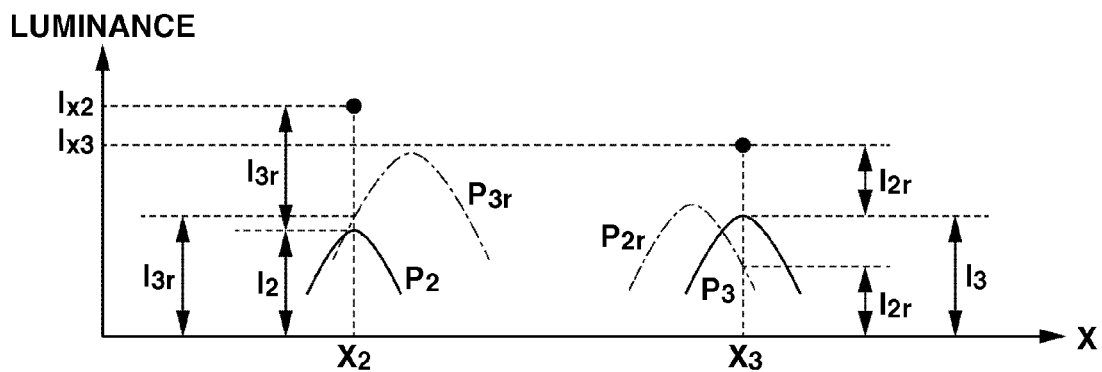
FIGS. 18A, 18B, and 18C illustrate example luminance values at pixel positions influenced by multiple reflections described in an eleventh exemplary embodiment.

Further, it is presumed that a pattern projected from the projection unit 1 causes a multiple reflection in an area including the measurement point $m_3$ and casts a glare in an area including the measurement point $m_2$. FIG. 18A illustrates the luminance value of a captured image influenced by multiple reflections occurring at the measurement point $m_2$ and the measurement point $m_3$ illustrated in FIG. 12. The projection unit 1 projects a pattern $P_2$ on an area including the measurement point $m_2$. Further, a pattern $P_{3,r}$ caused by the multiple reflection of the light pattern projected from the projection unit 1 to the measurement point $m_3$ casts a glare in an area including the measurement point $m_2$.

Accordingly, the luminance value of the captured image at a pixel $X_2$ that corresponds to the position of the measurement point $m_2$ is equal to a sum $I_{x2}$ of a luminance component $I_2$ of the pattern $P_2$ projected on the area including the measurement point $m_2$ and a luminance component $I_{3,r}$ of the pattern $P_{3,r}$ caused by the multiple reflection of the light pattern projected on the area including the measurement point $m_3$.

Therefore, the projection unit 1 and the imaging unit 2A may erroneously perform distance measuring processing about the measurement point $m_2$. On the other hand, the projection unit 1 projects a pattern $P_3$ on an area including the measurement point $m_3$. Further, a pattern $P_{2,r}$ caused by the multiple reflection of the light pattern projected from the projection unit 1 to the measurement point $m_2$ casts a glare in an area including the measurement point $m_3$. Accordingly, the luminance value of the captured image at a pixel $X_3$ that corresponds to the position of the measurement point $m_3$ is equal to a sum $I_{x3}$ of a luminance component $I_3$ of the pattern $P_3$ projected on the area including the measurement point $m_3$ and a luminance component $I_{2,r}$ of the pattern $P_{2,r}$ caused by the multiple reflection of the light pattern projected on the area including the measurement point $m_2$. Therefore, the projection unit 1 and the imaging unit 2A may erroneously perform distance measuring processing about the measurement point $m_3$.

Figure 18B:
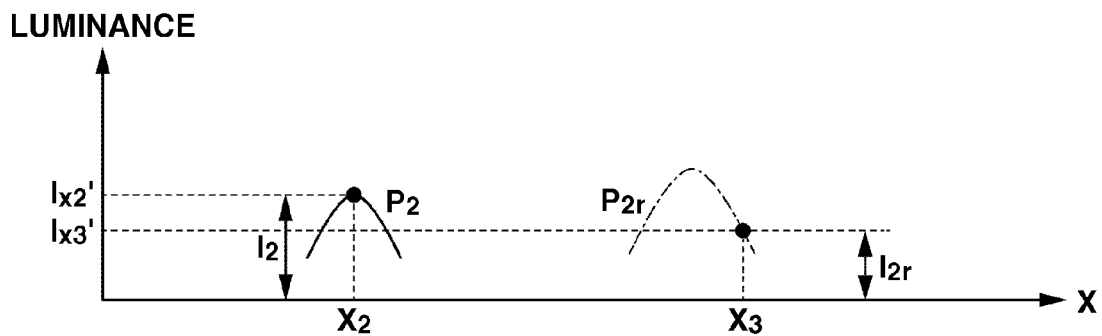

First, the distance measuring apparatus performs a first pattern updating operation for quenching or dimming a light pattern portion to be projected to the measurement point $m_3$ included in the occlusion area $O_{c1}$, thereby eliminating the multiple reflection occurring at the measurement point $m_3$. As a result, as illustrated in FIG. 18B, the luminance value of the captured image at the pixel $X_2$ that corresponds to the position of the measurement point $m_2$ is equal to a luminance value $I_{x2}'$ (i.e., the luminance component $I_2$ of the pattern $P_2$ projected on the area including the measurement point $m_2$). Therefore, the distance measuring apparatus can perform distance measuring processing for the measurement point $m_2$ without causing any error.

In this case, the distance measuring apparatus quenches or dims a light pattern portion to be projected on an area measurement point $m_3$. Therefore, the luminance value at the measurement point $m_3$ becomes equal to a luminance value $I_{x3}'$ (i.e., only the luminance component $I_{2,r}$ of the pattern $P_{2,r}$ caused by the multiple reflection of the light pattern projected on the area including the measurement point $m_2$). The distance measuring apparatus does not perform any distance measuring processing for the light pattern quenched or dimmed area.

Since the distance measurement for the measurement point $m_2$ has been accurately performed, the determination unit determines this point as being valid. Subsequently, the distance measuring apparatus performs a second pattern updating operation for quenching or dimming irradiated light in such a way as to eliminate any multiple reflection that may occur at the measurement point $m_2$.

Figure 18C:
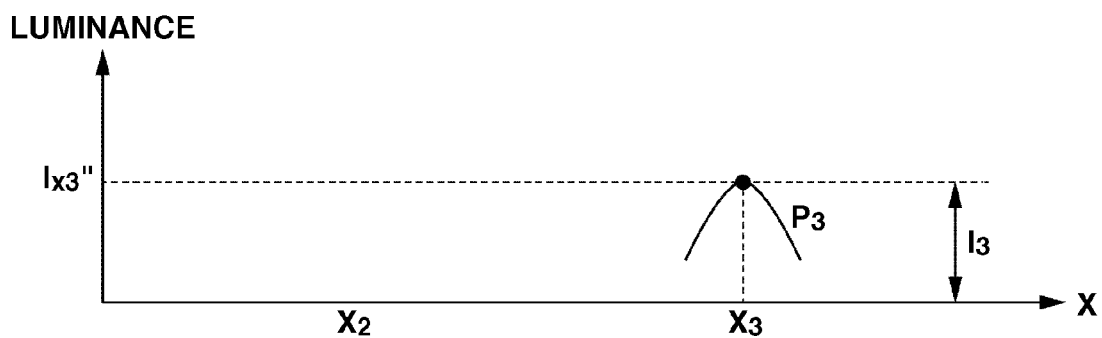

Further, as part of the second pattern updating processing, the distance measuring apparatus stops quenching or dimming the light pattern reaching the measurement point $m_3$ and then starts lightening or brightening the light pattern. As a result, as illustrated in FIG. 18C, the luminance value of the captured image at the pixel $X_3$ that corresponds to the position of the measurement point $m_3$ is equal to a luminance value $I_{x3}''$ (i.e., the luminance component $I_3$ of the pattern $P_3$ projected on the area including the measurement point $m_3$). Therefore, the distance measuring apparatus can perform distance measuring processing for the measurement point $m_3$ without causing any error.

Figure 19:
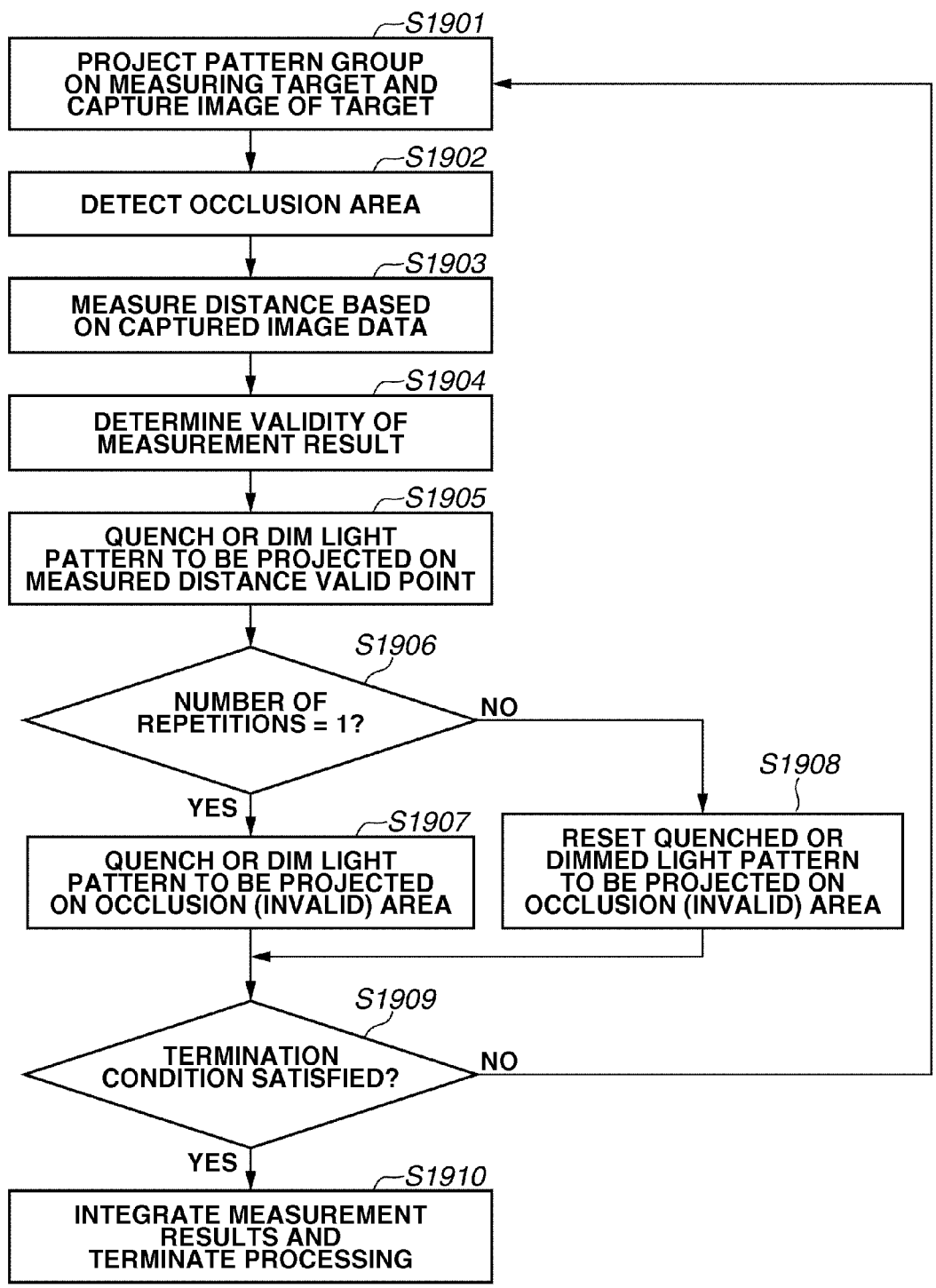
FIG. 19 is a flowchart illustrating processing that can be performed by a distance measuring apparatus according to the eleventh exemplary embodiment.

Example processing according to the eleventh exemplary embodiment, including measurement of a multiple reflection area, is described below with reference to a flowchart illustrated in FIG. 19.

Processing to be performed in steps S1901 to S1905 is similar to the processing performed in steps S1501 to S1505 (see FIG. 15) described in the ninth exemplary embodiment. Therefore, redundant description thereof will be avoided.

In step S1906, the distance measuring apparatus determines whether the number of repetitions is "1" with respect to the projection pattern updating processing. If it is determined that the number of repetitions is equal to "1" (YES in step S1906), the operation proceeds to step S1907. If it is determined that the number of repetitions is not equal to "1" (NO in step S1906), the operation proceeds to step S1908.

Processing to be performed in step S1907 is similar to the processing performed in step S1506 (see FIG. 15) described in the ninth exemplary embodiment. Therefore, redundant description thereof will be avoided.

In step S1908, the distance measuring apparatus lightens or brightens the light pattern to be projected to the area quenched or dimmed in step S1907.

Processing to be performed in steps S1909 and S1910 is similar to the processing performed in steps S1507 and S1508 (in FIG. 15) described in the ninth exemplary embodiment. Therefore, redundant description thereof will be avoided.

According to the eleventh exemplary embodiment, even when a multiple reflection occurring in other area influences an area remaining without being determined as being valid by the determination unit because a measuring target object cannot be observed by an imaging unit although a projection unit projects a pattern on the measuring target object, the distance measuring apparatus performs processing for quenching or dimming a projection pattern portion in such a way as to increase the valid distance value measurable area through repetitive processing while suppressing adverse influence to be caused by multiple reflections.

In the eleventh exemplary embodiment, the area lightened or brightened in step S1908 is no longer subjected to the pattern updating processing (which includes the quenching or dimming processing) in the second and subsequent pattern updating operations. However, as a modified embodiment, in step S1906, the distance measuring apparatus can determine whether the number of repetitions is 22" with respect to the projection pattern updating processing. Then, the distance measuring apparatus can perform the lightening or brightening processing only in the second pattern updating operation. In other words, the distance measuring apparatus restarts the quenching or dimming processing in the third pattern updating operation and continues the quenching or dimming processing in subsequent pattern updating operations. In this case, further suppressing adverse influence from being caused by the light pattern to be projected on this area is feasible in the repetitive processing to be performed in the second and subsequent pattern updating operations.

The distance measuring apparatus according to the eleventh exemplary embodiment of the present disclosure has a characteristic configuration as mentioned above.

A distance measuring apparatus according to a twelfth exemplary embodiment includes a determination unit configured to calculate a measurement reliability based on a captured image. The determination unit determines in such a way as to perform processing for quenching or dimming a light pattern portion that corresponds to an area in which the calculated measurement reliability is equal to or greater than a first threshold value. Further, the determination unit makes a determination in such a way as to perform processing for quenching or dimming a light pattern portion that corresponds to an area in which the calculated measurement reliability is equal to or less than a second threshold value.

Figure 20:
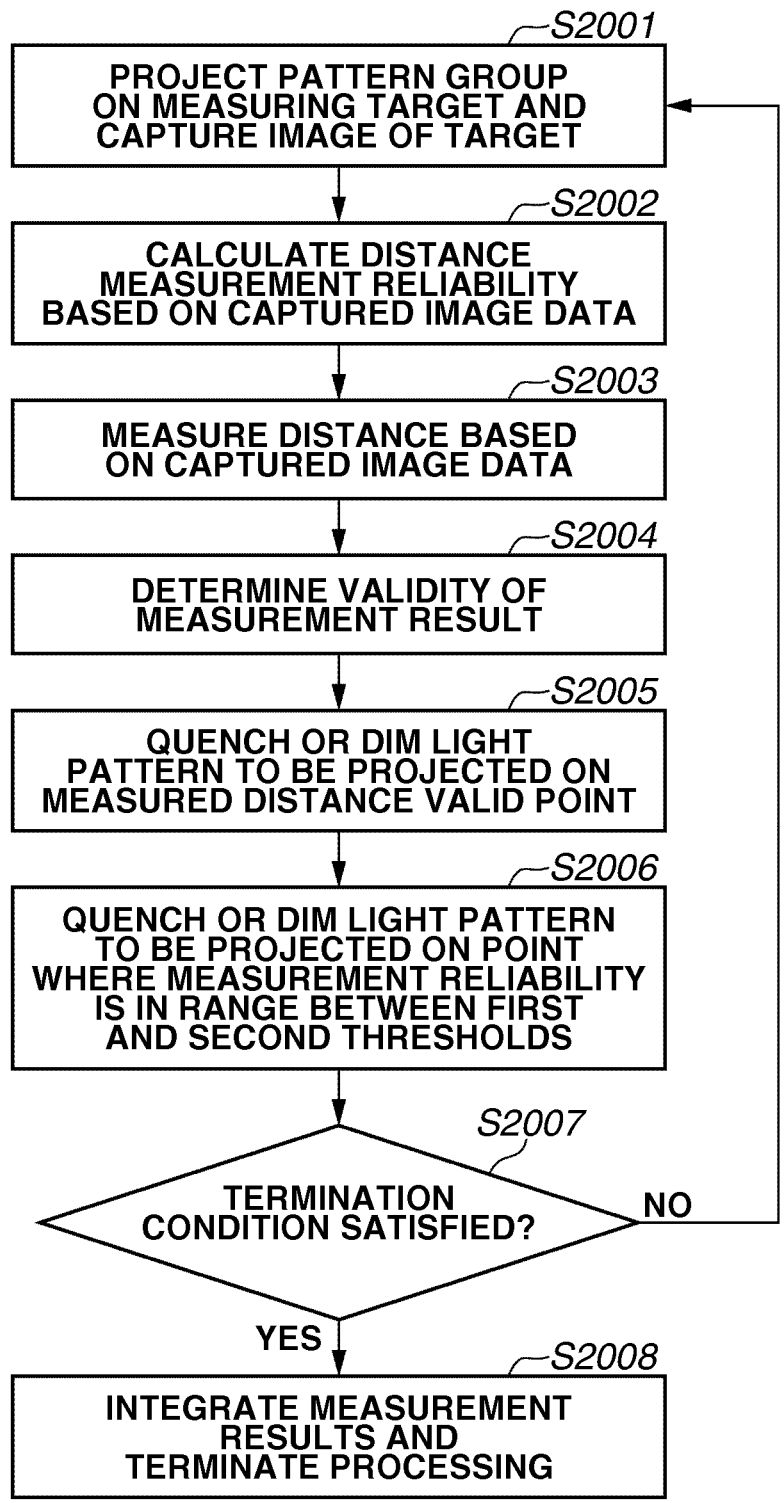
FIG. 20 is a flowchart illustrating processing that can be performed by a distance measuring apparatus according to a twelfth exemplary embodiment.

The distance measuring apparatus according to the present exemplary embodiment has a configuration similar to the apparatus (see FIG. 1) described in the ninth exemplary embodiment. Therefore, redundant description thereof will be avoided. A flowchart according to the twelfth exemplary embodiment is substantially similar to that (see FIG. 19) described in the eleventh exemplary embodiment. Therefore, redundant description thereof will be avoided if processing content is similar to that already described. Processing to be performed in each step containing different processing content is described below with reference to a flowchart illustrated in FIG. 20.

Processing to be performed in step S2001 is similar to the processed performed in step S1501 (see FIG. 15) described in the ninth exemplary embodiment. Therefore, redundant description thereof will be avoided.

In step S2002, the distance measuring apparatus calculates a distance measurement reliability based on the captured image. The distance measurement reliability is a numerical value calculated based on a factor that determines the accuracy of the distance measurement. In the present exemplary embodiment, the distance measuring apparatus uses a luminance value of the captured image in the calculation of the reliability without actually calculating distance, as described below.

Figure 21A:
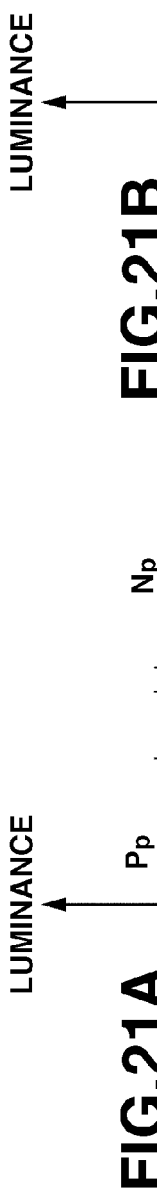
FIGS. 21A, 21B, 21C, and 21D illustrate distance measurement reliability in the complementary pattern projection method described in the twelfth exemplary embodiment.
Figure 21B:
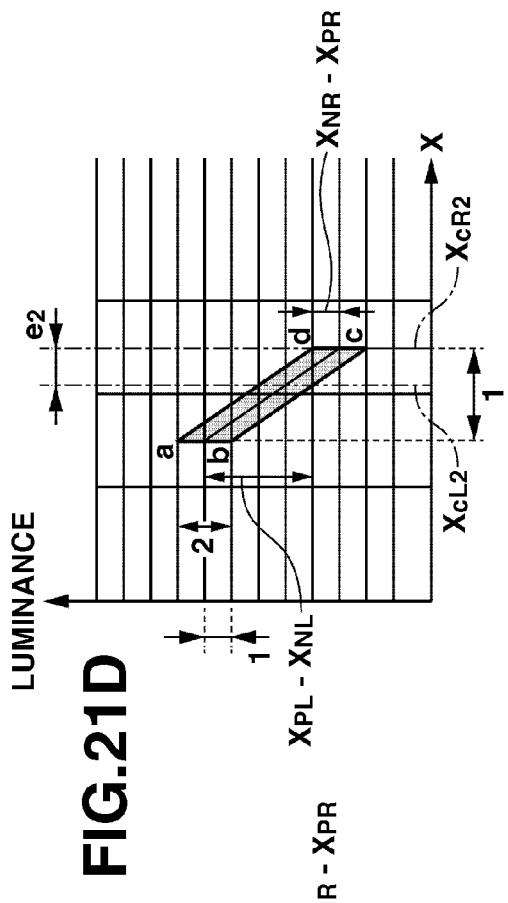

For example, the distance measurement pattern to be projected in the present exemplary embodiment is a code usable in the space coding method, as described below. FIGS. 21A, 21B, 21C, and 21D illustrate the boundary in the encoding in a complementary pattern projection method using the space coding method. According to the space coding method, the luminance value of the captured image becomes greater or smaller than a predetermined threshold value at the boundary position where the binary value of the code is switched. FIG. 21A illustrates example variations in the luminance at the boundary position (i.e., at the binary value switching position) in the complementary pattern projection method using the space coding method, in which symbols are similar to those described in FIG. 10C. FIG. 21B is similar to FIG. 21A, although variations in the luminance of the captured image are smaller. A luminance difference $I_d$ at an intersecting point of two patterns is equal to a sum of a difference between a luminance value $X_{PL}$ of the positive pattern at the pixel $X_L$ and a luminance value $X_{NL}$ of the negative pattern at the pixel $X_L$ and a difference between a luminance value $X_{NR}$ of the negative pattern at the pixel $X_R$ and a luminance value $X_{PR}$ of the positive pattern at the pixel $X_R$, as defined by the following formula (7).

$$I_d = \mathrm{abs}((x_{PL}-x_{NL}) + \mathrm{abs}(x_{NR}-x_{PR}) \quad (7)$$

Figure 21C:
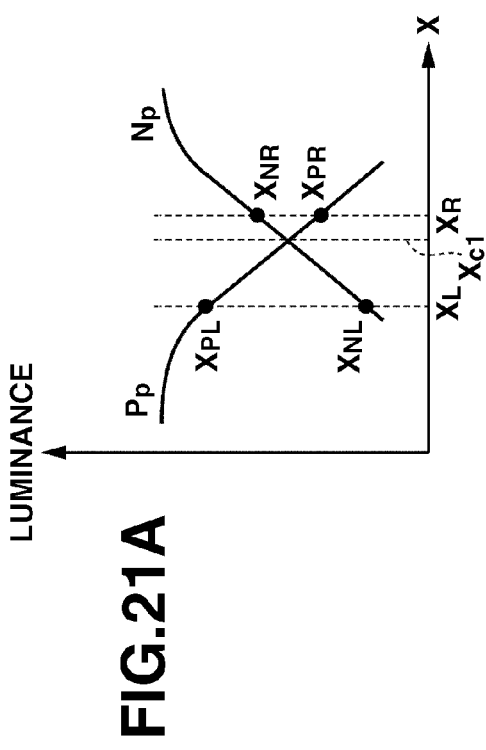

FIG. 21C illustrates a relationship between the luminance difference and the pattern intersecting position illustrated in FIG. 21A, assuming that the luminance difference $I_d$ is a luminance difference between neighboring pixels. In this case, if an error in quantizing the luminance value is taken into consideration, the degree of ambiguity about the luminance difference $X_{PL}-X_{NL}$ and the luminance difference $X_{NR}-X_{PR}$ is comparable to a luminance value 2 at maximum. Therefore, the degree of ambiguity can be expressed by a parallelogram range "abcd."

Figure 21D:
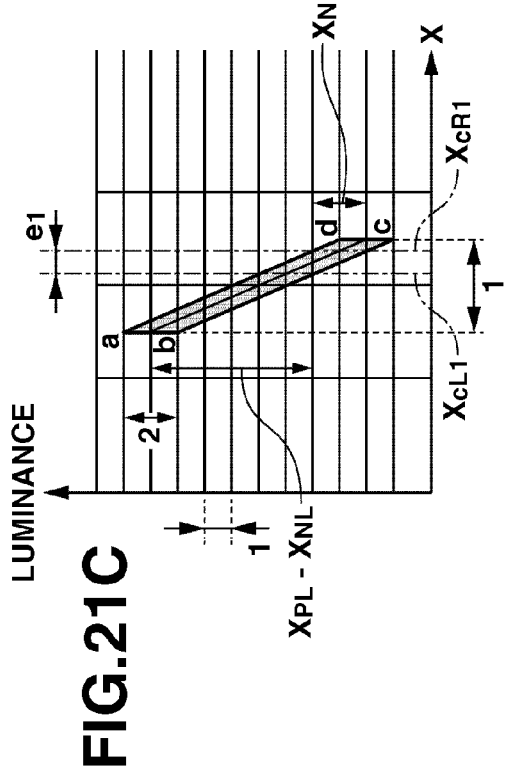

The pattern intersecting position within one pixel, which is calculated based on the luminance difference including the above-mentioned ambiguity, is in a range between $X_{cL1}$ and $X_{cR1}$ and causes an error equivalent to a subpixel estimation error $e_1$. FIG. 21D illustrates a relationship between the luminance difference and the pattern intersecting position illustrated in FIG. 21B. The pattern intersecting position calculated similarly is in a range between $X_{cL2}$ and $X_{cR2}$ and causes an error equivalent to a subpixel estimation error $e_2$, which is greater than the above-mentioned error $e_1$. As mentioned above, an error becomes greater if the encoding boundary position is estimated based on subpixel accuracy when the luminance change value between pixels is smaller (compared to a case where the luminance change value is larger). The distance measurement accuracy deteriorates, if calculated based on these data. Accordingly, it is feasible to use the magnitude of the variation in the luminance value between pixels can be used as a distance measurement reliability.

Processing to be performed in steps S2003 to step S2005 is similar to the processing performed in steps S1503 to S1505 (see FIG. 15) described in the ninth exemplary embodiment. Therefore, redundant description thereof will be avoided.

In step S2006, the distance measuring apparatus updates the projection pattern group in such a way as to quench or dim a projection pattern portion that corresponds to an area where the distance measurement reliability calculated in step S2004 is equal to or greater than the first threshold value. Further, the distance measuring apparatus updates the projection pattern group in such a way as to quench or dim a projection pattern portion that corresponds to an area where the calculated distance measurement reliability is equal to or less than the second threshold value.

If it is determined that the distance measurement reliability is equal to or greater than the first threshold value, it can be regarded that the distance can be accurately measured and a desired distance measurement result can be obtained. Therefore, the distance measuring apparatus does not perform the repetitive processing for the corresponding area.

On the other hand, if it is determined that the distance measurement reliability is equal to or less than the second threshold value, it can be regarded that the distance cannot be accurately measured and a desired distance measurement result cannot be obtained. Therefore, the distance measuring apparatus does not perform the repetitive processing for the corresponding area.

Accordingly, in any case, the distance measuring apparatus quenches or dims a light pattern portion that illuminates the above-mentioned area and projects an updated projection pattern in the next repetitive processing, thereby removing adverse influence to be caused by multiple reflections.

Processing to be performed in steps S2007 and S2008 is similar to the processing performed in steps 1507 to 1508 (see FIG. 15) described in the ninth exemplary embodiment. Therefore, redundant description thereof will be avoided.

The distance measuring apparatus according to the twelfth exemplary embodiment quenches or dims a projection pattern portion that corresponds to an area where the distance measurement reliability is equal to or greater than the first threshold value and a valid distance measurement value is obtainable, and a projection pattern portion that corresponds to an area where the distance measurement reliability is equal to or less than the second threshold value (i.e., an area that remains without being determined as valid by the determination unit). Therefore, the distance measuring apparatus according to the twelfth exemplary embodiment can increase the valid distance value measurable area through repetitive processing while suppressing adverse influence to be caused by multiple reflections.

The example configuration described in the twelfth exemplary embodiment includes two imaging units. However, similar to the ninth exemplary embodiment, the present disclosure is not limited to the above-mentioned example. It is useful to provide an arbitrary number of imaging units. Further, similar to the tenth exemplary embodiment, the present disclosure is not limited to the above-mentioned example. It is useful to provide two projection units and a single imaging unit. It is useful to provide an arbitrary number of projection units.

Further, in the twelfth exemplary embodiment, if the distance measuring apparatus quenches or dims a pattern portion that corresponds to an area where the distance measurement reliability is equal to or less than the second threshold value, the distance measuring apparatus keeps the quenched or dimmed state in subsequent pattern updating operations. Alternatively, similar to the eleventh exemplary embodiment, it is useful to stop the pattern quenching or dimming processing and lightening or brightening the pattern portion in the second and subsequent pattern updating operations. It is also useful to perform the lightening or brightening processing only in the second pattern updating operation.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims priority from Japanese Patent Applications No. 2012-205582 filed Sep. 19, 2012 and No. 2012-267555 filed Dec. 6, 2012, which are hereby incorporated by reference herein in their entirety.

What is claimed is:

1. An information processing apparatus comprising:
an obtaining unit configured to obtain a first image and a second image of a measuring target object with a light pattern projected thereon by a projection unit, wherein the first image and the second image are, respectively, captured by a first imaging unit and a second imaging unit disposed at a position different from a position of the first imaging unit;
a measurement unit configured to measure distance information about the measuring target object based on the first image and the second image captured by the first imaging unit and the second imaging unit, respectively;
a determination unit configured to determine that the measured distance information is valid in a case where a difference between first distance information about the measuring target object and second distance information about the measuring target object is within a predetermined threshold, the first distance information being measured based on the first image and the second distance information being measured based on the second image; and
a control unit configured to reduce luminance of a light pattern, included in a projected light pattern, which is projected on an area with respect to which the measured distance is determined by the determination unit to be valid.

2. The information processing apparatus according to claim 1, wherein the control unit is configured to perform control including reducing the luminance of the projected light pattern to zero.

3. The information processing apparatus according to claim 1, wherein the projected light pattern is a stripe pattern.

4. The information processing apparatus according to claim 1, wherein the projection unit is configured to sequentially project a plurality of light patterns on the measuring target object,
wherein the first imaging unit and the second imaging unit are each configured to sequentially capture an image of the measuring target object for each of the plurality of light patterns in a state where the plurality of light patterns is sequentially projected on the measuring target object,
wherein the measurement unit is configured to measure the first distance information and the second distance information about the measuring target object based on each image captured by the first and second imaging units, and
wherein the determination unit is configured to determine that the measured distance information is valid in a case where the difference between the first distance information and the second distance information is within a predetermined threshold.

5. The information processing apparatus according to claim 1, wherein the determination unit is configured to determine whether the distance information about the measuring target object, measured by the measurement unit, is valid further based on information relating to a shape of the measuring target object.

6. The information processing apparatus according to claim 1, further comprising a termination determination unit configured to determine whether a predetermined termination determination condition is satisfied, after processing in each unit defined by claim 1 is completed,
wherein, if the termination determination unit determines that the termination determination condition is not satisfied, processing in each unit defined by claim 1 is repeated.

7. The information processing apparatus according to claim 6, wherein the termination determination unit is configured to perform determination based on a number of repetitions with respect to sequential processing in units defined by claim 1.

8. The information processing apparatus according to claim 6, wherein the termination determination unit is configured to perform determination based on a time used to complete sequential processing in units defined by claim 1.

9. The information processing apparatus according to claim 6, wherein the termination determination unit is configured to perform determination based on a past measurement result and a present measurement result obtained by the determination unit.

10. The information processing apparatus according to claim 1, further comprising an acquisition unit configured to acquire a difficult-to-measure area, in which measuring the distance from the projection unit, the first imaging unit, or the second imaging unit to the measuring target object is difficult, based on the first image and the second image captured by the first imaging unit and the second imaging unit, respectively, wherein the difficult-to-measure area is at least one of an occlusion area where the measuring target object is concealed when the measuring target object is observed from the first imaging unit, the second imaging unit, or the projection unit and a saturation area where a luminance value in the captured image is saturated,
wherein the control unit is configured to reduce luminance of a light pattern, included in the projected light pattern, which is projected on the acquired difficult-to-measure area and luminance of a light pattern, included in the projected light pattern, which is projected on the area with respect to which the measured distance is determined by the determination unit to be valid.

11. The information processing apparatus according to claim 10, wherein the acquisition unit is configured to acquire a reliability of the distance information measured by the measurement unit based on a luminance value in each of the first image and the second image captured by the first imaging unit and the second imaging unit, respectively, and to acquire the difficult-to-measure area based on the acquired reliability.

12. The information processing apparatus according to claim 10, further comprising a termination determination unit configured to determine whether a predetermined termination determination condition is satisfied, after processing in each unit defined by claim 10 is completed,
wherein if the termination determination unit determines that the termination determination condition is not satisfied, processing in each unit defined by claim 1 is repeated.

13. The information processing apparatus according to claim 1, further comprising:
the projection unit configured to project a light pattern on the measuring target object, and
the first imaging unit and the second imaging unit each configured to capture a first image and a second image of the measuring target object, respectively.

14. The information processing apparatus according to claim 1, wherein the imaging conditions differ from one to another in the position of the projection unit projecting the light pattern.

15. The information processing apparatus according to claim 1, wherein the imaging conditions differ from one to another in the position of each of the first imaging unit and the second imaging unit capturing the measurement target object.

16. An information processing method comprising:
obtaining a first image and a second image of a measuring target object with a light pattern projected thereon by a projection unit, wherein the first image and the second image are, respectively, captured by a first imaging unit and a second imaging unit disposed at a position different from a position of the first imaging unit;
measuring distance information about the measuring target object based on the first image and the second image captured by the first imaging unit and the second imaging unit, respectively;
determining that the measured distance information is valid in a case where a difference between first distance information about the measuring target object and second distance information about the measuring target object is within a predetermined threshold, the first distance information being measured based on the first image and the second distance information being measured based on the second image; and
performing control to reduce luminance of a light pattern, included in the projected light pattern, which is projected on an area with respect to which the measured distance is determined to be valid.

17. A non-transitory computer readable storage medium storing a computer-executable program that causes a computer to perform an information processing method, wherein the information processing method comprising:

obtaining a first image and a second image of a measuring target object with the light pattern projected thereon by a projection unit, wherein the first image and the second image are, respectively, captured by a first imaging unit and a second imaging unit disposed at a position different from a position of the first imaging unit;

measuring distance information about the measuring target object based on the first image and the second image captured by the first imaging unit and the second imaging unit, respectively;

determining that the measured distance information is valid in a case where a difference between first distance information about the measuring target object and second distance information about the measuring target object is within a predetermined threshold, the first distance information being measured based on the first image and the second distance information being measured based on the second image; and performing control to reduce luminance of a light pattern, included in the projected light pattern, which is projected on an area with respect to which the measured distance is determined to be valid.

* * * * *